United States Patent
Yang et al.

(10) Patent No.: US 12,469,143 B1
(45) Date of Patent: Nov. 11, 2025

(54) METHOD FOR DETERMINING ALIGNMENT STATE, CONTROLLER, AND MATERIAL HANDLING EQUIPMENT

(71) Applicant: VisionNav Robotics USA Inc., Acworth, GA (US)

(72) Inventors: Siqi Yang, Acworth, GA (US); Bingchuan Yang, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/083,730

(22) Filed: Mar. 19, 2025

(30) Foreign Application Priority Data

Jan. 27, 2025 (CN) .......................... 202510126360.4

(51) Int. Cl.
   *G06T 7/73* (2017.01)
   *G06T 7/13* (2017.01)
(52) U.S. Cl.
   CPC .................. *G06T 7/13* (2017.01); *G06T 7/74* (2017.01); *G06T 2207/10028* (2013.01); *G06T 2207/30172* (2013.01)
(58) Field of Classification Search
   None
   See application file for complete search history.

(56) References Cited

U.S. PATENT DOCUMENTS

| 2021/0023717 A1 | 1/2021 | Yu et al. | |
|---|---|---|---|
| 2022/0089419 A1* | 3/2022 | Kim | G05D 1/247 |
| 2024/0404091 A1* | 12/2024 | Zhu | G06T 7/149 |

FOREIGN PATENT DOCUMENTS

| CN | 112907668 A | 6/2021 |
|---|---|---|
| CN | 115123839 B | 12/2022 |
| CN | 117788940 A | 3/2024 |

\* cited by examiner

*Primary Examiner* — Ian L Lemieux
(74) *Attorney, Agent, or Firm* — Westbridge IP LLC

(57) ABSTRACT

Disclosed are a method for determining an alignment state, a controller, and material handling equipment. A main technical solution includes: acquiring, by using a sensor, a target point cloud of a first stacking object and a target point cloud of a second stacking object; determining, based on the target point cloud of the first stacking object, a first pseudo image corresponding to the first stacking object; determining, based on the target point cloud of the second stacking object, a second pseudo image corresponding to the second stacking object; determining relative pose data between the first stacking object and the second stacking object based on the first pseudo image and the second pseudo image; and comparing the relative pose data with a threshold to determine an alignment state between the first stacking object and the second stacking object.

17 Claims, 15 Drawing Sheets

METHOD FOR DETERMINING ALIGNMENT STATE, CONTROLLER, AND MATERIAL HANDLING EQUIPMENT

CROSS-REFERENCE TO RELATED APPLICATIONS

This present disclosure claims priority to Chinese Patent Application No. 202510126360.4, filed on Jan. 27, 2025, which is hereby incorporated by reference in its entirety.

TECHNICAL FIELD

The present disclosure relates to the field of warehousing and logistics technology and machine vision, and in particular, to a method for determining an alignment state, a controller, and material handling equipment.

BACKGROUND

A system that uses material handling equipment such as an automated guided vehicle (AGV) during operation has advantages such as being highly unmanned, automated, and intelligent, which improves production efficiency and an operational level in industries such as warehousing, manufacturing, and logistics. In a typical scenario, material handling equipment is often responsible for moving various goods, during which stacking of goods is inevitably involved. The goods are usually packed by using a cardboard box or the like, or stored by using a material cage, a wooden box, a plastic box, or the like.

In consideration of space utilization, stacking objects such as cardboard boxes, material cages, and wooden boxes that are loaded with goods may be stacked in a process of moving the goods by the material handling equipment. In view of stability, the material handling equipment is required to accurately stack one stacking object onto another stacking object. In this process, if the two stacking objects cannot be aligned, operation safety may be affected.

SUMMARY

The present disclosure provides a method for determining an alignment state, a controller, and material handling equipment, to control a first stacking object and a second stacking object to be aligned with each other during stacking.

According to a first aspect a method for determining an alignment state is provided in an embodiment of the present disclosure. The method includes: acquiring, by using a sensor, a target point cloud of a first stacking object and a target point cloud of a second stacking object; determining, based on the target point cloud of the first stacking object, a first pseudo image corresponding to the first stacking object; determining, based on the target point cloud of the second stacking object, a second pseudo image corresponding to the second stacking object; determining relative pose data between the first stacking object and the second stacking object based on the first pseudo image and the second pseudo image; and comparing the relative pose data with a threshold to determine an alignment state between the first stacking object and the second stacking object.

Optionally, the first pseudo image is a first grayscale image, and the second pseudo image is a second grayscale image.

Optionally, the method further includes:
before determining the alignment state, controlling material handling equipment to move the first stacking object to a preparation position to complete a pre-alignment action relative to the second stacking object.

Optionally, the determining the relative pose data between the first stacking object and the second stacking object based on the first pseudo image and the second pseudo image includes:
determining a boundary line of the first pseudo image;
determining a target point in the first pseudo image based on the boundary line of the first pseudo image;
determining a boundary line of the second pseudo image;
determining a target point in the second pseudo image based on the boundary line of the second pseudo image; and
determining the relative pose data between the first stacking object and the second stacking object based on the boundary line of the first pseudo image and the target point in the first pseudo image and the boundary line of the second pseudo image and the target point in the second pseudo image.

Optionally, the determining the target point in the first pseudo image based on the boundary line of the first pseudo image includes:
determining a centerline of the first pseudo image based on a third boundary line and a fifth boundary line of the first pseudo image; and using an intersection between the centerline of the first pseudo image and a first boundary line of the first pseudo image as the target point in the first pseudo image.

The determining the target point in the second pseudo image based on the boundary line of the second pseudo image includes:
determining a centerline of the second pseudo image based on a fourth boundary line and a sixth boundary line of the second pseudo image; and using an intersection between the centerline of the second pseudo image and a second boundary line of the second pseudo image as the target point in the second pseudo image.

Optionally, the third boundary line and the fifth boundary line of the first pseudo image are parallel to each other.

The second boundary line and the fourth boundary line of the second pseudo image are parallel to each other.

The third boundary line of the first pseudo image is perpendicular to the first boundary line of the first pseudo image, and the fifth boundary line of the first pseudo image is perpendicular to the first boundary line of the first pseudo image.

The fourth boundary line of the second pseudo image is perpendicular to the second boundary line of the second pseudo image, and the sixth boundary line of the second pseudo image is perpendicular to the second boundary line of the second pseudo image.

Optionally, the target point in the first pseudo image is a midpoint of the first boundary line of the first pseudo image.

The target point in the second pseudo image is a midpoint of the second boundary line of the second pseudo image.

Optionally, the determining the relative pose data between the first stacking object and the second stacking object based on the first pseudo image and the second pseudo image includes:
determining a boundary line of the first pseudo image;
determining, from the target point cloud of the first stacking object, a boundary point cloud, corresponding to the boundary line of the first pseudo image, of the first stacking object;
determining a first target point of the first stacking object based on the boundary point cloud of the first stacking object;

determining a boundary line of the second pseudo image;
determining, from the target point cloud of the second stacking object, a boundary point cloud, corresponding to the boundary line of the second pseudo image, of the second stacking object;
determining a second target point of the second stacking object based on the boundary point cloud of the second stacking object;
determining a relative angle difference between the first stacking object and the second stacking object based on the boundary point cloud of the first stacking object and the boundary point cloud of the second stacking object; and
determining the relative pose data between the first stacking object and the second stacking object based on a relative position difference between the first target point and the second target point and the relative angle difference.

Optionally, the determining the first target point of the first stacking object based on the boundary point cloud of the first stacking object includes:
determining a first edge line of the first stacking object based on the first boundary point cloud;
determining a third edge line of the first stacking object based on the third boundary point cloud;
determining a fifth edge line of the first stacking object based on the fifth boundary point cloud;
determining a first centerline based on the third edge line and the fifth edge line; and
determining the first target point based on the first centerline and the first edge line; and
the determining the second target point of the second stacking object based on the boundary point cloud of the second stacking object includes:
determining a second edge line of the second stacking object based on the second boundary point cloud;
determining a fourth edge line of the second stacking object based on the fourth boundary point cloud;
determining a sixth edge line of the second stacking object based on the sixth boundary point cloud;
determining a second centerline based on the second edge line and the sixth edge line; and
determining the second target point based on the second centerline and the second edge line.

Optionally, the first target point is an intersection between the first centerline and the first edge line; and the second target point is an intersection between the second centerline and the second edge line.

Optionally, the determining the relative angle difference between the first stacking object and the second stacking object based on the boundary point cloud of the first stacking object and the boundary point cloud of the second stacking object includes:
calculating a first angle between the first edge line and the second edge line, and determining the relative angle difference between the first stacking object and the second stacking object based on the first angle.

Optionally, the determining the relative angle difference between the first stacking object and the second stacking object based on the boundary point cloud of the first stacking object and the boundary point cloud of the second stacking object includes:
calculating a second angle between the first centerline and the second centerline, and determining the relative angle difference between the first stacking object and the second stacking object based on the second angle.

Optionally, the determining the relative angle difference between the first stacking object and the second stacking object based on the boundary point cloud of the first stacking object and the boundary point cloud of the second stacking object includes:
calculating a second angle between the first centerline and the second centerline;
calculating a first angle between the first edge line and the second edge line; and
obtaining the relative angle difference between the first stacking object and the second stacking object by weighting the first angle and the second angle.

Optionally, the determining the relative angle difference between the first stacking object and the second stacking object based on the boundary point cloud of the first stacking object and the boundary point cloud of the second stacking object includes:
determining a first angle value of the first stacking object;
determining a second angle value of the second stacking object; and
determining the relative angle difference between the first stacking object and the second stacking object based on a difference between the first angle value and the second angle value.

Optionally, the determining the first angle value of the first stacking object includes:
determining the first angle value of the first stacking object based on an angle of the first edge line; or
determining the first angle value of the first stacking object based on an angle of the first centerline; or
obtaining the first angle value of the first stacking object by weighting the angle of the first centerline and the angle of the first edge line.

Optionally, the determining the second angle value of the second stacking object includes:
determining the second angle value of the second stacking object based on an angle of the second edge line; or
determining the second angle value of the second stacking object based on an angle of the second centerline; or
obtaining the second angle value of the second stacking object by weighting the angle of the second centerline and the angle of the second edge line.

Optionally, the determining, based on the target point cloud of the first stacking object, the first pseudo image corresponding to the first stacking object includes:
projecting the target point cloud of the first stacking object onto a horizontal plane to generate the first pseudo image.

The determining, based on the target point cloud of the second stacking object, the second pseudo image corresponding to the second stacking object includes:
projecting the target point cloud of the second stacking object onto a horizontal plane to generate the second pseudo image.

Optionally, the projecting the target point cloud of the first stacking object onto the horizontal plane to generate the first pseudo image includes:
projecting the target point cloud of the first stacking object onto a horizontal plane by using at least two projection resolutions, to obtain pseudo images with the at least two projection resolutions that correspond to the target point cloud of the first stacking object; and scaling the pseudo images with the at least two projection resolutions that correspond to the target point cloud of the first stacking object to a uniform size, and superimposing the pseudo images to obtain the first pseudo image.

The projecting the target point cloud of the second stacking object onto the horizontal plane to generate the second pseudo image includes:

projecting the target point cloud of the second stacking object onto a horizontal plane by using at least two projection resolutions, to obtain pseudo images with the at least two projection resolutions that correspond to the target point cloud of the second stacking object; and scaling the pseudo images with the at least two projection resolutions that correspond to the target point cloud of the second stacking object to a uniform size, and superimposing the pseudo images to obtain the second pseudo image.

Optionally, the determining, based on the target point cloud of the first stacking object, the first pseudo image corresponding to the first stacking object includes:

projecting the target point cloud of the first stacking object onto a horizontal plane by using at least two projection resolutions, to obtain images with the at least two projection resolutions that correspond to the target point cloud of the first stacking object; and scaling the images with the at least two projection resolutions that correspond to the target point cloud of the first stacking object to a uniform size, superimposing the images, and converting the superimposed images into the first grayscale image.

The determining, based on the target point cloud of the second stacking object, the second pseudo image corresponding to the second stacking object includes:

projecting the target point cloud of the second stacking object onto a horizontal plane by using at least two projection resolutions, to obtain images with the at least two projection resolutions that correspond to the target point cloud of the first stacking object; and scaling the images with the at least two projection resolutions that correspond to the target point cloud of the first stacking object to a uniform size, superimposing the images, and converting the superimposed images into the second grayscale image.

Optionally, the boundary line of the first grayscale image is obtained in the following manner.

A line is extracted from the first grayscale image by using a probabilistic Hough transform line detection algorithm, and the boundary line of the first grayscale image is determined from extracted lines based on a size of the first stacking object.

The boundary line of the second grayscale image is obtained in the following manner.

A line is extracted from the second grayscale image by using the probabilistic Hough transform line detection algorithm, and the boundary line of the second grayscale image is determined from extracted lines based on a size of the second stacking object.

Optionally, extracting a line from a grayscale image by using the probabilistic Hough transform line detection algorithm includes:

sorting pixels in the grayscale image by grayscale values to obtain a pixel sequence set, where the pixel sequence set includes a plurality of pixel sequences, with each pixel sequence including pixels corresponding to a same grayscale value;

sequentially selecting, according to the sorting, a pixel sequence as a current pixel sequence, and randomly selecting a pixel from the current pixel sequence to find a line with a highest probability within an angle range, where a quantity of pixels on the line meets a line length requirement and a sum of grayscale values on the line is maximized; and if a distance between the found line and the extracted line is greater than or equal to a maximum line spacing threshold, extracting the line, removing the current pixel sequence from the pixel sequence set, and selecting a next pixel sequence as a current pixel sequence, until the pixel sequence set is empty.

Optionally, the comparing the relative pose data with the threshold to determine the alignment state between the first stacking object and the second stacking object includes:

in a case where the relative pose data is greater than or equal to the threshold, determining the alignment state as misaligned; and in a case where the relative pose data is less than the threshold, determining the alignment state as aligned.

Optionally, the method further includes:

when the alignment state is misaligned, controlling material handling equipment to adjust a pose;

re-acquiring, by using the sensor, a target point cloud of the first stacking object and a target point cloud of the second stacking object;

re-determining the relative pose data; and re-determining the alignment state based on the relative pose data until the relative pose data is less than the threshold.

Optionally, the method further includes:

when the alignment state is aligned, controlling material handling equipment to place the first stacking object onto the second stacking object to complete stacking.

According to a second aspect, a controller is provided in an embodiment of the present disclosure. The controller is configured to execute a program instruction to implement the method according to any implementation in the first aspect.

According to a third aspect, material handling equipment is provided in an embodiment of the present disclosure. The material handling equipment includes a controller, where the controller is configured to execute a program instruction to implement the method according to any implementation in the first aspect.

According to specific embodiments provided in the present disclosure, the present disclosure discloses the following technical effects.

Firstly, according to the present disclosure, the first pseudo image of the first stacking object is determined based on the target point cloud of the first stacking object that is acquired by the sensor, and the second pseudo image corresponding to the second stacking object is determined based on the target point cloud of the second stacking object that is acquired by the sensor. Next, the relative pose data between the first stacking object and the second stacking object is determined based on the first pseudo image and the second pseudo image, and the relative pose data is compared with the threshold to determine the alignment state between the first stacking object and the second stacking object. In this manner, the relative pose data between the first stacking object and the second stacking object can be determined in a stacking process, and the alignment state between the first stacking object and the second stacking object can be determined based on the relative pose data and the threshold. By using this solution, impacts of an external environment (for example, uneven ground) and an error of material handling equipment may be prevented, and pose data of the first stacking object and the second stacking object may be accurately calculated, to determine the alignment state between the first stacking object and the second stacking object.

Secondly, according to the present disclosure, a target point in the first pseudo image is determined based on a boundary line of the first pseudo image, and a target point in the second pseudo image is determined based on a boundary line of the second pseudo image, and the relative pose data is determined between the first stacking object and the second stacking object based on the boundary line of the first pseudo image and the target point in the second pseudo image. In this manner, the relative pose data between the first stacking object and the second stacking object can be determined in a stacking process, and the alignment state between the first stacking object and the second stacking object can be determined based on the relative pose data and the threshold. By using this solution, impacts of an external environment (for example, uneven ground) and an error of material handling equipment may be prevented, and pose data of the first stacking object and the second stacking object may be accurately calculated, to determine the alignment state between the first stacking object and the second stacking object.

Thirdly, according to the present disclosure, boundary point clouds are determined from the target point clouds based on the boundary lines of the pseudo images, a first target point of the first stacking object and a second target point of the second stacking object are determined based on the boundary point clouds, and the relative pose data between the first stacking object and the second stacking object is further determined based on the first target point and the boundary point cloud of the first stacking object and the second target point and the boundary point cloud of the second stacking object. In this manner, the relative pose data between the first stacking object and the second stacking object can be determined in a stacking process, and the alignment state between the first stacking object and the second stacking object can be determined based on the relative pose data and the threshold. By using this solution, impacts of an external environment (for example, uneven ground) and an error of material handling equipment may be prevented, and pose data of the first stacking object and the second stacking object may be accurately calculated, to determine the alignment state between the first stacking object and the second stacking object.

Fourthly, according to the present disclosure, a third edge line and a fifth edge line are determined respectively, from the target point cloud of the first stacking object, based on a third boundary line and a fifth boundary line that are parallel to each other in the first pseudo image, and a first centerline of the first stacking object is determined based on the third edge line and the fifth edge line. Then, the first target point is determined based on an intersection between the first centerline of the first stacking object and a first edge line corresponding to a first boundary point cloud. According to the present disclosure, a fourth edge line and a sixth edge line are determined respectively, from the target point cloud of the second stacking object, based on a fourth boundary line and a sixth boundary line that are parallel to each other in the second pseudo image, and a second centerline of the second stacking object is determined based on the fourth edge line and the sixth edge line. Then, the second target point is determined based on an intersection between the second centerline of the second stacking object and a second edge line corresponding to a second boundary point cloud. In the foregoing manner, the first target point and the second target point can be quickly determined by using a relatively small calculation amount.

Fifthly, according to the present disclosure, both the target point cloud of the first stacking object and the target point cloud of the second stacking object are projected onto a horizontal plane by using at least two projection resolutions, and pseudo images with the at least two projection resolutions that correspond to the target point cloud of the first stacking object and the target point cloud of the second stacking object are scaled to a uniform size, and the pseudo images are superimposed to obtain the first pseudo image corresponding to the first stacking object and the second pseudo image corresponding to the second stacking object. First, converting the point clouds into pseudo images and superimposing the pseudo images may reduce dimensions and complexity of data, thereby improving processing efficiency. Second, projection is performed by using the at least two projection resolutions, so that features of the point clouds on different scales may be captured; and the pseudo images on different scales are superimposed, so that the superimposed pseudo images further enhances feature information in the pseudo images on a basis of reserving original features of the point clouds, thereby improving identification and information quantity of the pseudo images. Third, a plurality of pseudo images are scaled to a uniform size and superimposed, so that noise and errors in the pseudo images may be averaged, thereby improving quality of the pseudo images to a certain extent.

Lastly, according to the present disclosure, the pose of the material handling equipment is adjusted dynamically based on the relative pose data and the threshold; when the relative pose data is greater than or equal to the threshold, the pose of the material handling equipment is adjusted based on the relative pose data, and target point clouds, collected by the sensor mounted on the material handling equipment, are re-acquired, to re-determine the relative pose data based on the target point clouds; and the alignment state is re-determined based on relative pose data until the relative pose data is less than the threshold, and then the material handling equipment is controlled to place the first stacking object onto the second stacking object to complete stacking. This forms a closed-loop servo detection process. In this servo detection process, it is unnecessary to stop operation of the material handling equipment.

Certainly, any invention of the present disclosure is not necessarily required to achieve all of the advantages described above.

BRIEF DESCRIPTION OF THE DRAWINGS

To describe the technical solutions in the embodiments of the present disclosure or in the conventional technology more clearly, the following briefly describes the accompanying drawings required for describing the embodiments. Apparently, the accompanying drawings in the following description only show some embodiments of the present disclosure, and a person of ordinary skill in the art may still derive other drawings from these accompanying drawings without creative efforts.

DETAILED DESCRIPTION OF THE EMBODIMENTS

The following clearly and completely describes the technical solutions in embodiments of the present disclosure with reference to the accompanying drawings in embodiments of the present disclosure. Apparently, the described embodiments are merely some but not all of embodiments of the present disclosure. All other embodiments obtained by persons of ordinary skill in the art based on the embodiments of the present disclosure shall fall within the protection scope of the present disclosure.

Terms used in the embodiments of the present invention are merely intended to describe specific embodiments, but are not intended to limit the present invention. The singular forms of "a/an", "said", and "the" used in embodiments of the present invention and the appended claims are also intended to include plural forms, unless the context clearly implies otherwise.

It should be understood that, the term "and/or" used in this specification is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects. In addition, the term "based on" used in this specification is not limited to being based on an object only. For example, determining B based on A may indicate: determining B based on A only, or determining B partially based on A.

In a related technology, stacking is performed on an upper stacking object and a lower stacking object based on a pose of the lower stacking object relative to material handling equipment, and impacts of aspects such as an inaccurate pickup pose of the upper stacking object, uneven ground, a cumulative error of an odometer, and an error of the material handling equipment are not considered. As a result, the upper stacking object and the lower stacking object are not aligned during stacking, which affects operation safety.

Figure 1:
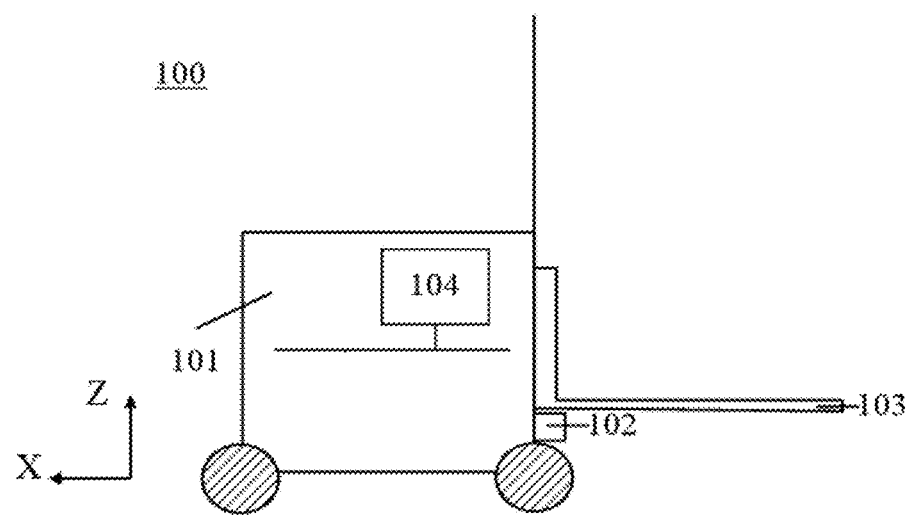
FIG. 1 is a schematic diagram of a system of material handling equipment to which embodiments of the present disclosure are applicable.

In view of this, the present disclosure provides a new idea. In order to facilitate understanding of the present disclosure, the following first describes a schematic diagram of a system of material handling equipment on which the present disclosure is based. FIG. 1 is a schematic diagram of a system of material handling equipment to which embodiments of the present disclosure are applicable. As shown in FIG. 1, material handling equipment 100 includes a material handling equipment body 101, a sensor 102, a stacking execution component 103 and a controller 104. For example, the controller 104 may include a memory and a processor. The memory is configured to store a program instruction, and the controller is configured to execute the program instruction to implement the method of the embodiments of the present disclosure.

The material handling equipment 100 involved in embodiments of the present disclosure may be an automated guided forklift, a pallet truck, a crane truck, an Automated Guided Vehicle (AGV), an Automatic Mobile Robot (AMR), a humanoid robot, or the like. The stacking execution component 103 may be a fork, a robotic arm, or the like.

The controller 104 is configured to control the stacking execution component 103 of the material handling equipment 100 to stack a first stacking object and a second stacking object. The controller 104 may be a system or device that performs computation or control functions, such as a control mainboard, a control box, a control unit, a vehicle-mounted computer, a computing platform, a tablet computer, or a computer on the material handling equipment body 101, or a system or device that performs computation or control functions in a local server or cloud server, or a handheld controller or remote controller, or in other forms, which is not limited in embodiments of the present disclosure.

The sensor 102 may be in a form of a sensor module, and at least includes a sensor configured to collect point cloud data.

The stacking object involved in embodiments of the present disclosure may be goods with an outer package, or a container containing goods, for example, a material cage, a wooden box, or a plastic box. In embodiments of the present disclosure, a material cage is used as an example for description. A material cage is also referred to as a material frame, a storage cage, a warehouse cage, or an iron cage. It is an important logistics equipment and is widely used because of its strong structure, stackability, durability, and environmental protection.

Concepts of nouns involved in embodiments of the present disclosure are first described.

Processor: It is responsible for executing core functions such as calculation, control and decision-making. It may receive data from a sensor, run control algorithms, and command an actuator to complete a task. Common processor types may include: a central processing unit (CPU), a digital signal processor (DSP), a microcontroller unit (MCU), and so on. The processor in the specification may refer to a collection of processors for performing the same or different tasks.

Memory: It is configured to store data or a program. A memory in the specification may be referred to as a collection of memories for performing the same or different tasks.

Controller: At the hardware level, the controller generally includes a processor and a memory. Optionally, the controller may also include input and output interfaces, a mainboard, peripheral circuits and elements. At the software level, the controller generally includes a control algorithm, an operating system, a communication protocol, and so on. A controller in the specification may be referred to as a collection of controllers for performing the same or different tasks.

Mobile robot: It refers to a robot that can move autonomously or under control in an environment. Common types include an automated guided vehicle (AGV), an autonomous mobile robot (AMR), a humanoid robot, and the like, and also include other types such as a robotic vacuum cleaner.

Material handling equipment: It refers to a device that may automatically or semi-automatically perform a handling task. Common forms of the material handling equipment include a forklift, an automated guided vehicle (AGV), an autonomous mobile robot (AMR), a humanoid robot, a robotic arm, and the like.

Automated guided forklift (AGF): It is an intelligent industrial vehicle that integrates a forklift technology and an automated guided vehicle (AGV) technology. It can automatically complete tasks such as material handling and stacking.

Stacking refers to arranging and piling up some objects vertically according to a specific rule.

Stacking object refers to an object involved in stacking, and specifically may be goods itself or goods with a simple package such as a wrapping film, or may be a container that can hold and carry goods, for example, a material cage, a wooden box, a plastic box, or a pallet.

Stacking process refers to a process in which material handling equipment lifts a first stacking object to make the first stacking object move close to a second stacking object, and then adjusts a pose of the material handling equipment to align the first stacking object with the second stacking object, and thus places the first stacking object on the second stacking object, so as to complete stacking.

The first stacking object refers to a stacking object located above another. The second stacking object refers to a stacking object located below.

Figure 2:
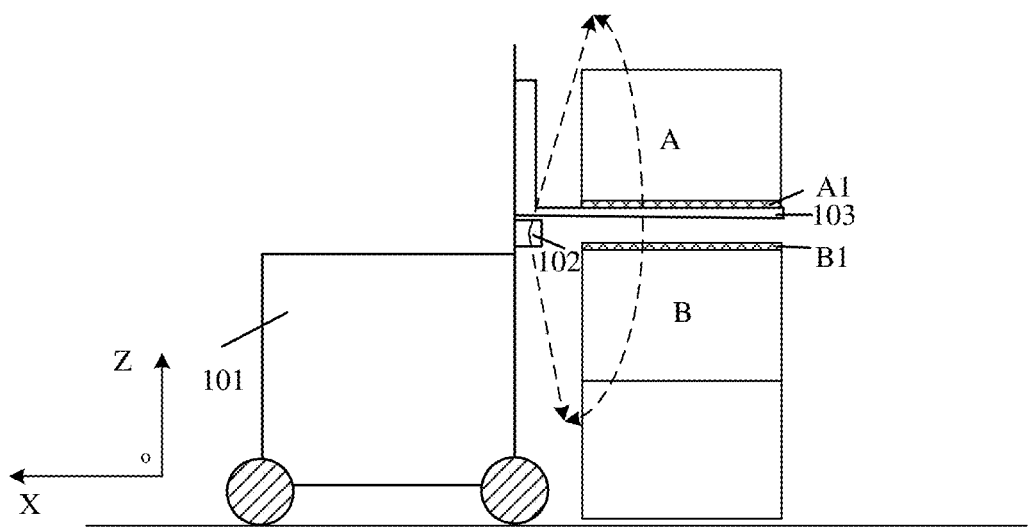
FIG. 2 is a diagram of an application scenario according to an embodiment of the present disclosure.
Figure 3:
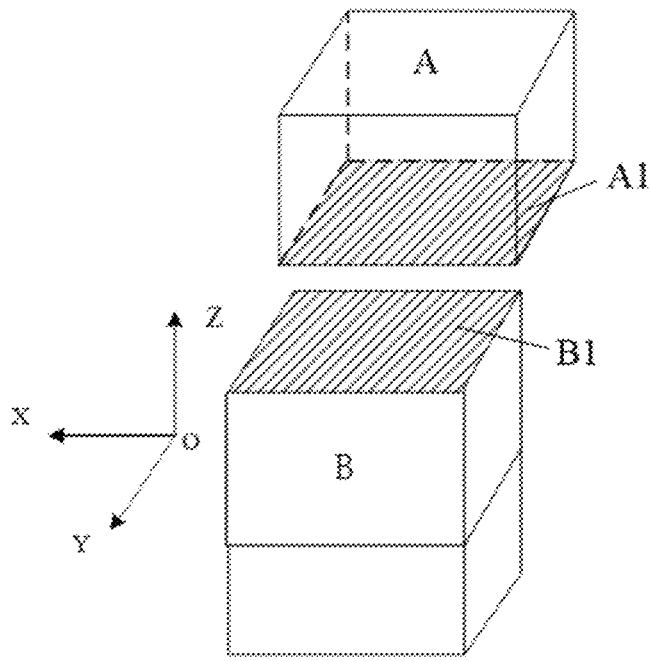
FIG. 3 is a schematic diagram of regions that are parallel to each other of a first stacking object and a second stacking object in FIG. 2 during alignment.

Alignment state refers to a state in which two or more stacking objects are arranged in a vertical direction, and at least part of border lines of a stacking object are parallel to or overlapped with those of another stacking object. The vertical direction refers to a Z-axis (for example, a Z-axis in FIG. 1, FIG. 2, and FIG. 3) direction in a coordinate system of material handling equipment. As shown in FIG. 2 and FIG. 3, a first target image region A1 of a first stacking object A and a second target image region B1 of a second stacking object B are arranged along a line in the vertical direction, and border lines of A1 are parallel to those of A2.

A 3D coordinate system in FIG. 3 consists of an origin O, an X-axis, a Y-axis, and a Z-axis. The coordinate axes intersect each other perpendicularly. Optionally, a geometric center of the material handling equipment is used as the point O. A forward-backward travel direction (that is, a longitudinal direction of the material handling equipment body 101) of the material handling equipment is used as the X-axis, where a positive direction of the X-axis is a direction away from an attachment (for example, a fork) of the material handling equipment. A lateral direction of the material handling equipment body 101 is used as the Y-axis. The height direction of the material handling equipment is used as the Z-axis.

In FIG. 1 and FIG. 2, "X" corresponds to the X-axis in the 3D coordinate system described above, "O" corresponds to the origin O in the 3D coordinate system described above, "Z" corresponds to the Z-axis in the 3D coordinate system described above, and "Y" corresponds to the Y-axis in the 3D coordinate system described above, where a positive direction of the Y-axis is perpendicular to the page, pointing outward (not shown in FIG. 1 and FIG. 2).

Target point cloud refers to point cloud data of target regions that is acquired by the sensor, where the target regions refer to specific regions that are on the first stacking object and the second stacking object and that are used for detection and analysis, for example, key structural regions such as boundaries or edge target points of the first stacking object and the second stacking object.

Pseudo image (Pseudo-image) refers to an image generated by an algorithm or processed by using some special technologies in the field of computer image processing or computer vision. Pseudo images may not represent actual image data, or may have a virtualized or approximate relationship with a real image. In some cases, a pseudo image may also refer to a simulated image or an image used to represent an unreal world scenario.

Grayscale image (Grayscale Image) refers to a single-channel image form, in which luminance information of each pixel is represented by only one value, typically ranging from 0 to 255 (for an 8-bit depth image). A grayscale value of 0 represents pure black, 255 represents pure white, and intermediate values represent varying shades of gray.

Grayscale value refers to a pixel value in the foregoing grayscale image and is generally used to represent brightness of an image, that is, a gray value. A larger grayscale value indicates a brighter pixel. On the contrary, a smaller grayscale value indicates a darker pixel.

Pose refers to a position and an orientation of an object in space, generally including coordinates and an angle.

Relative pose data is generally used to indicate a relative position relationship between two objects, specifically referring to a difference between two pieces of pose data.

Figure 4:
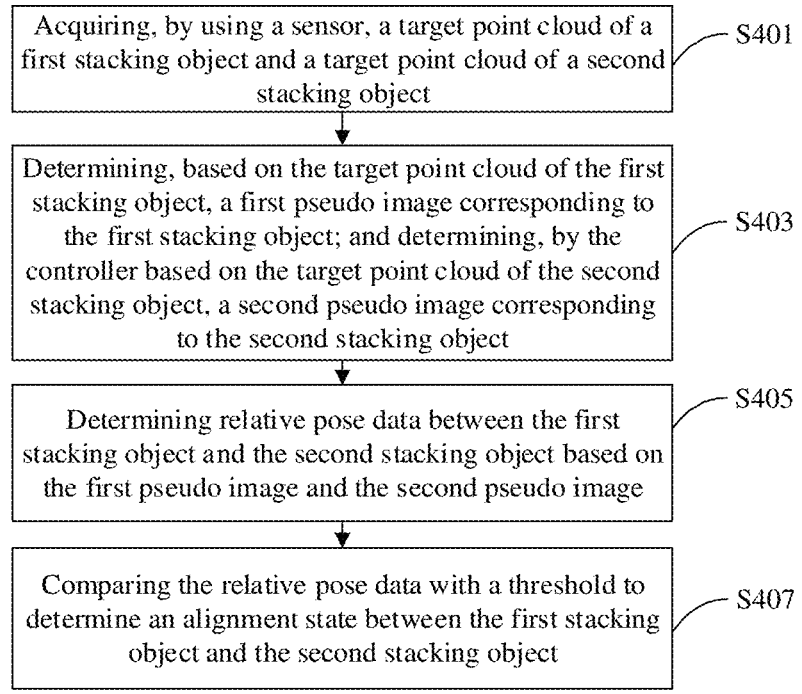
FIG. 4 is a flowchart of a method for determining an alignment state according to an embodiment of the present disclosure.

FIG. 4 is a flowchart of a method for determining an alignment state according to an embodiment of the present disclosure. The method may be executed by an automated guided forklift. As shown in FIG. 4, the method may include the following steps:

Step S401: acquiring, by using a sensor, a target point cloud of a first stacking object and a target point cloud of a second stacking object;

Step S403: determining, based on the target point cloud of the first stacking object, a first pseudo image corresponding to the first stacking object; and determining, based on the target point cloud of the second stacking object, a second pseudo image corresponding to the second stacking object;

Step S405: determining relative pose data between the first stacking object and the second stacking object based on the first pseudo image and the second pseudo image; and Step S407: comparing the relative pose data with a threshold to determine an alignment state between the first stacking object and the second stacking object.

It may be seen from the foregoing process that, according to the present disclosure, the first pseudo image corresponding to the first stacking object is determined based on the target point cloud of the first stacking object that is acquired by the sensor, and the second pseudo image corresponding to the second stacking object is determined based on the target point cloud of the second stacking object that is acquired by the sensor. Next, the relative pose data between the first stacking object and the second stacking object is determined based on the first pseudo image and the second pseudo image, and the relative pose data is compared with the threshold to determine the alignment state between the first stacking object and the second stacking object. In this manner, the relative pose data between the first stacking object and the second stacking object can be determined in a stacking process, and the alignment state between the first stacking object and the second stacking object can be determined based on the relative pose data and the threshold. By using this solution, impacts of an external environment (for example, uneven ground) and an error of material handling equipment may be prevented, and pose data of the first stacking object and the second stacking object may be accurately calculated, to determine the alignment state between the first stacking object and the second stacking object.

The following describes in detail steps in the foregoing procedure and effects that can be further generated with reference to embodiments. It should be noted that limitations related to "first", "second", and the like in the present disclosure do not have limitations in terms of size, order, quantity, and the like, and are merely used for distinguishing in name. For example, the "first stacking object" and the "second stacking object" are used to distinguish between two stacking objects. For another example, the "first pseudo image" and the "second pseudo image" are used to distinguish between two pseudo images.

First, the "acquiring, by using the sensor, the target point cloud of the first stacking object and the target point cloud of the second stacking object" in Step S401 is described in detail with reference to embodiments.

A stacking scenario involved in embodiments of the present disclosure is first briefly introduced. As shown in FIG. 2, when the automated guided forklift receives a handling task of stacking a first stacking object A onto a second stacking object B, the controller (for example, the controller 104 shown in FIG. 1) controls a fork of the automated guided forklift to pick up the first stacking object A, and then controls the automated guided forklift to move to a position near the second stacking object B. By controlling a pose of the automated guided forklift, the controller aligns a first target image region A1 of the first stacking object A with a second target image region B1 of the second stacking object B in a vertical direction, and then stacks the first stacking object A onto the second stacking object B. When the controller controls the automated guided forklift to stack the first stacking object A onto the second stacking object B, the first stacking object A and the second stacking object B are not aligned with each other due to an external environment (for example, uneven ground) and an error of the automated guided forklift. This embodiment of the present disclosure is a solution proposed to resolve this problem.

In embodiments of the present disclosure, depending on different models of sensors, a plurality of sensors may be selected and installed to simultaneously scan both the first stacking object and the second stacking object.

An odometer estimates a distance of the automated guided forklift traveled by measuring its motion, and usually calculates, in combination with sensor data (that is, data collected by the sensor), physical quantities such as a position, a velocity, and an orientation of the automated guided forklift.

The sensor may be disposed at a preset distance (for example, on a truck body or a fork arm structure) below a midpoint between fork arm bases of the automated guided forklift, or may be disposed at another position according to an actual condition. The odometer may be disposed at a position near a wheel of the automated guided forklift to record a quantity of rotations of the wheel, thereby estimating a distance traveled. Alternatively, the odometer may be disposed at the center of a chassis of the automated guided forklift.

For example, both the sensor and the odometer described above may be controlled by the controller (the controller 104 shown in FIG. 1) built in the automated guided forklift, for example, may be controlled by using an SoC (System-on-a-Chip, system-on-a-chip), which is not specifically limited in embodiments of the present disclosure.

Before pose adjustment information of the automated guided forklift is determined, it is required to perform time synchronization between the odometer and the sensor. The synchronization may be implemented using a common synchronization method (such as a hardware synchronization method, or a software synchronization method (such as time stamp alignment or interpolation synchronization)).

In embodiments of the present disclosure, when the automated guided forklift is controlled to lift the first stacking object, and the sensor identifies the first stacking object and the second stacking object simultaneously through scanning, the target point cloud of the first stacking object and the target point cloud of the second stacking object are collected. Specifically:

The automated guided forklift moves the first stacking object to a stacking operation position, the automated guided forklift lifts the first stacking object, and when the sensor mounted on the automated guided forklift identifies the first stacking object and the second stacking object through scanning, the sensor acquires the target point cloud of the first stacking object and the target point cloud of the second stacking object.

The stacking operation position may refer to a position where the sensor on the material handling equipment can simultaneously acquire target point clouds of both the first stacking object and the second stacking object. At this position, a fork of the automated guided forklift can stack the first stacking object and the second stacking object within a variable pose range of the fork. For example, based on a position of the second stacking object (for example, a stacking object below), a position within a preset distance range in front of the second stacking object serves as the stacking operation position.

Considering distortions in the target point clouds collected when the first stacking object and the second stacking object are simultaneously scanned by the sensor, in embodiments of the present disclosure, the acquiring, by using the sensor, the target point cloud of the first stacking object and the target point cloud of the second stacking object may further include: collecting, by the sensor mounted on the automated guided forklift, an original point cloud of the first stacking object; transforming the original point cloud of the first stacking object from a coordinate system in which the sensor is located to a coordinate system in which the automated guided forklift is located, and performing distortion correction on the original point cloud of the first stacking object based on odometer information collected by the automated guided forklift, to obtain a target point cloud; and collecting, by the sensor mounted on the automated guided forklift, an original point cloud of the second stacking object; and transforming the original point cloud of the second stacking object from the coordinate system in which the sensor is located to the coordinate system in which the automated guided forklift is located, and performing distortion correction on the original point cloud of the second stacking object based on odometer information collected by the automated guided forklift, to obtain a target point cloud.

Distortions in the original point clouds of the first stacking object and the second stacking object refer to shape distortions caused by motion of the sensor or external factors. The odometer information contains motion information of the sensor while collecting the original point clouds. These information generally include a position, a speed, acceleration, and the like. A compensation transformation matrix may be determined based on the odometer information. The compensation transformation matrix may be then applied to each point in the original point clouds to obtain distortion-corrected point clouds (that is, the target point cloud of the first stacking object and the target point cloud of the second stacking object).

According to embodiments of the present disclosure, the original point clouds collected by the sensor are transformed from the coordinate system in which the sensor is located to the coordinate system in which the automated guided forklift is located, and distortion correction is performed on the original point clouds based on the odometer information, so that distortion-free target point clouds can be obtained.

The sensor involved in embodiments of the present disclosure may include a radar module, where the radar module may include one or more radars. The radar may be installed at a position a preset distance below a midpoint between root parts of the stacking execution component (such as a fork) of the automated guided forklift, so that an overall field of view (for example, a fan-shaped region enclosed by dashed arrows in FIG. 2) of the radar can cover the target regions of the first stacking object and the second stacking object. Therefore, the target point clouds of the first stacking object and the second stacking object may be collected by the radar. Optionally, the radar is a Lidar (Lidar). The Lidar may include a 3D Lidar.

It should be noted that the embodiments of the present disclosure may be applied to a scenario of a plurality of stacking objects.

The "determining, based on the target point cloud of the first stacking object, the first pseudo image corresponding to the first stacking object; and determining, based on the target point cloud of the second stacking object, the second pseudo image corresponding to the second stacking object" in Step S403 is described below in detail with reference to embodiments.

In embodiments of the present disclosure, a projection point of each point in the target point cloud of the first stacking object and the target point cloud of the second stacking object on a same horizontal plane (for example, an XOY plane) is determined. This typically involves transforming coordinates of the point clouds from an original coordinate system to a coordinate system in which the XOY plane is located and retaining 2D position information (such as X and Y coordinates). Optionally, the target point cloud of the first stacking object is projected downward onto the XOY plane to generate a first projection (for example, an upper image or a lower image in part (a) of FIG. 5), and thus the first projection is used as the first pseudo image of the first stacking object; and the target point cloud of the second stacking object is projected downward onto the XOY plane to generate a second projection (for example, an upper image or a lower image in part (a) of FIG. 6), and thus the second projection is used as the second pseudo image corresponding to the second stacking object. In the XOY plane, "X" corresponds to the X-axis in the 3D coordinate system described above; "O" corresponds to the origin O in the 3D coordinate system described above; and "Y" corresponds to the Y-axis in the 3D coordinate system described above.

Figure 5:
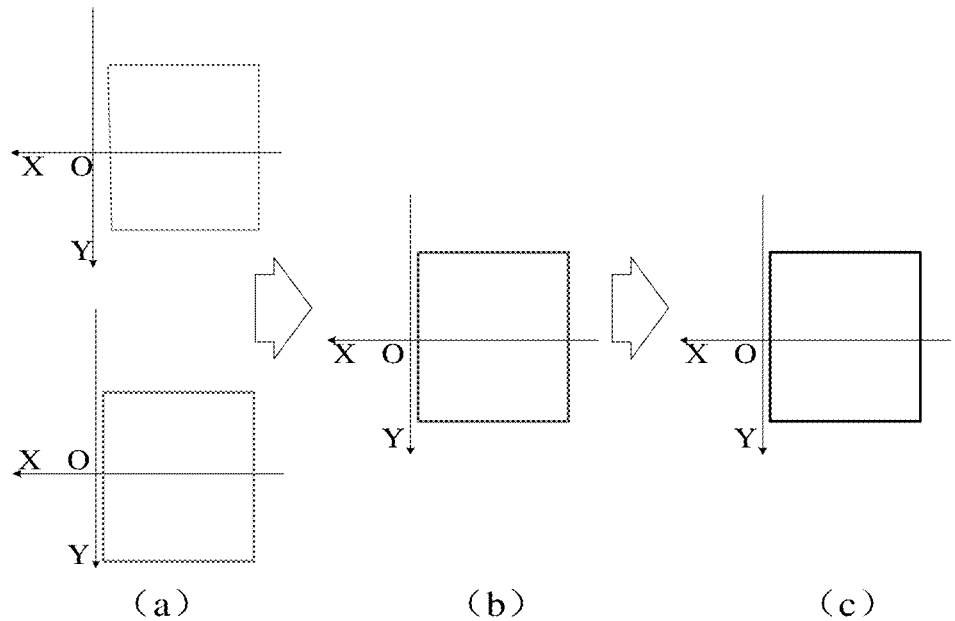
FIG. 5 is a schematic diagram of generating a first grayscale image according to an embodiment of the present disclosure.

As shown in FIG. 5, in some embodiments, the target point cloud of the first stacking object is projected onto the XOY plane by using at least two projection resolutions, to obtain at least two projections (as shown in part (a) of FIG. 5), and the projections obtained by using the at least two projection resolutions that correspond to the target point cloud of the first stacking object are scaled to a uniform size, and the projections are superimposed to obtain a superimposed projection (as shown in part (b) of FIG. 5). Thus, the superimposed projection is used as the first pseudo image of the first stacking object. In the same manner, the target point cloud of the second stacking object is projected onto the XOY plane by using at least two projection resolutions, to obtain at least two projections (as shown in part (a) of FIG. 6), the projections obtained by using the at least two projection resolutions that correspond to the target point cloud of the second stacking object are scaled to a uniform size, and the projections are superimposed to obtain a superimposed projection (as shown in part (b) of FIG. 6). Thus, the superimposed projection is used as the second pseudo image corresponding to the second stacking object.

In some embodiments, the target point cloud of the first stacking object is projected onto the XOY plane by using at least two projection resolutions, to obtain at least two projections (as shown in part (a) of FIG. 5), the projections obtained by using the at least two projection resolutions that correspond to the target point cloud of the first stacking object are scaled to a uniform size, the projections are superimposed to obtain a superimposed projection (as shown in part (b) of FIG. 5), and the superimposed projection is converted into a first grayscale image (as shown in part (c) of FIG. 5). Thus, the first grayscale image is used as the first pseudo image of the first stacking object. In the same manner, the target point cloud of the second stacking object is projected onto the XOY plane by using at least two projection resolutions, to obtain at least two projections (as shown in part (a) of FIG. 6), the projections obtained by using the at least two projection resolutions that correspond to the target point cloud of the second stacking object are scaled to a uniform size, the projections are superimposed to obtain a superimposed projection (as shown in part (b) of FIG. 6), and the superimposed projection is converted into a second grayscale image (as shown in part (c) of FIG. 6).

Thus, the second grayscale image is used as the second pseudo image corresponding to the second stacking object. The purpose of scaling to the uniform size is to ensure that the projections with the at least two projection resolutions are correctly aligned with each other before superimposing, so as to avoid misalignment or ghosting after superimposing.

Unifying sizes of the pseudo images with the at least two projection resolutions may refer to scaling the sizes of all pseudo images with the at least two projection resolutions to a specified size.

Optionally, unifying sizes of pseudo images with at least two projection resolutions may alternatively refer to first determining a maximum pseudo image from the pseudo images obtained by using the at least two projection resolutions, and then unifying a size of a pseudo image obtained by using a projection resolution other than the projection resolution of the maximum pseudo image to the size of the maximum pseuso image.

Pixel values in the grayscale images (that is, the first grayscale image and the second grayscale image) described above are generally used to indicate a brightness level, namely grayscale values, of the images. A larger grayscale value indicates a brighter pixel. On the contrary, a smaller grayscale value indicates a darker pixel. When a point cloud is projected onto pixels, a grayscale value of a pixel may be adjusted based on attributes of points in the point cloud.

In a process in which each of the target point cloud of the first stacking object and the target point cloud of the second stacking object is projected onto the XOY plane and obtains a grayscale image by conversion, a grayscale value in the grayscale image may be determined based on attributes of points (such as at least one of a point quantity, a point intensity, a distance between points, a point angle, or an elevation difference between points in the point cloud) in the point cloud projected onto the pixels.

After determining the grayscale value, a corresponding pixel position on the grayscale image is found based on 2D position information (X and Y coordinates) of a corresponding projection point, and thus the determined grayscale value is used as a pixel value at the pixel position. This process is repeated until all projection points are processed, thereby generating the complete grayscale image.

Optionally, a projection resolution used for the target point cloud of the first stacking object may be the same as a projection resolution used for the target point cloud of the second stacking object, for example, two projection resolutions of 5 mm (millimeter)/pixel (pixel) or 1 cm (centimeter)/pixel may be used for both the target point cloud of the first stacking object and the target point cloud of the second stacking object.

For example, projecting the target point cloud of the first stacking object onto the XOY plane at 5 mm/pixel and 1 cm/pixel to generate the first grayscale image corresponding to the first stacking object may include the following steps:

Step 1: projecting the target point cloud of the first stacking object onto the XOY plane at 5 mm/pixel and 1 cm/pixel to generate a pseudo image corresponding to 5 mm/pixel and a pseudo image corresponding to 1 cm/pixel (corresponding to the upper image and the lower image in part (a) of FIG. 5, respectively). Herein, a higher projection resolution indicates a clearer image. In addition, lines in the upper image and the lower image in part (a) of FIG. 5 typically reflect contour lines or feature lines of the first stacking object from a specific perspective (i.e., a perspective corresponding to a top view).

Step 2: scaling a projection corresponding to 5 mm/pixel and a projection corresponding to 1 cm/pixel to a uniform size, superimposing the projections to obtain a superimposed projection (as shown in part (b) of FIG. 5), and converting the superimposed projection into a grayscale image, to obtain the first grayscale image (as shown in part (c) of FIG. 5) corresponding to the first stacking object.

A manner of generating the second grayscale image is similar to that of generating the first grayscale image.

In FIG. 5, "O" corresponds to the origin O in the 3D coordinate system described above, "X" corresponds to the X-axis in the 3D coordinate system described above, and "Y" corresponds to the Y-axis in the 3D coordinate system described above.

In some embodiments, each projection generated by using a projection resolution may be split into three channels. A first channel is generated by using a quantity of points in a point cloud projected onto the pixels. A larger quantity of points in the point cloud indicates a higher pixel value. A second channel is generated by using relative pose data of a distance between the point cloud and a target (i.e., a theoretical position of a stacking object). A larger amount of relative pose data indicates a lower pixel value. A third channel is generated by using an elevation difference between points in the point cloud. Within a specific height range, a larger elevation difference indicates a higher pixel value.

In embodiments of the present disclosure, the pixel value in the grayscale image is determined based on at least one of the following attributes of the points in the point cloud projected onto the pixels: a point quantity, a point intensity, a distance between points, a point angle, or an elevation difference between points in the point cloud, so that the pixel values in the grayscale image reflect multi-dimensional attributes of the point cloud, improving accuracy of determining a boundary line from the grayscale image.

The "determining the relative pose data between the first stacking object and the second stacking object based on the first pseudo image and the second pseudo image" in Step S405 is described below in detail with reference to embodiments.

In embodiments of the present disclosure, the pose of the first stacking object is determined based on key structures such as boundaries and target points extracted from the first pseudo image that is generated by projecting the target point cloud of the first stacking object onto the horizontal plane. The pose of the second stacking object is determined based on key features such as boundaries and target points extracted from the second pseudo image that is generated by projecting the target point cloud of the second stacking object onto the horizontal plane. The relative pose data is determined based on the pose of the first stacking object and the pose of the second stacking object.

In embodiments of the present disclosure, the determining the relative pose data between the first stacking object and the second stacking object based on the first pseudo image and the second pseudo image includes:

determining a boundary line of the first pseudo image; determining a target point in the first pseudo image based on the boundary line of the first pseudo image; determining a boundary line of the second pseudo image; determining a target point in the second pseudo image based on the boundary line of the second pseudo image; and determining the relative pose data between the first stacking object and the second stacking object based on the boundary line of the first pseudo image and the target point in the first pseudo image and the boundary line of the second pseudo image and the target point in the second pseudo image.

In embodiments of the present disclosure, the boundary line of the first pseudo image may be as follows: a boundary line of a first projection generated by projecting the target point cloud of the first stacking object downward onto the XOY plane, for example, a boundary line (each corresponding to an edge of a rectangle) in the upper image or the lower image in part (a) of FIG. 5; or a boundary line of a superimposed projection obtained by scaling the projections that are obtained by using the at least two projection resolutions and corresponding to the target point cloud of the first stacking object to a uniform size and superimposing the projections, for example, a boundary line (each corresponding to an edge line of a rectangle) in the image shown in part (b) of FIG. 5; or a boundary line of the first grayscale image, for example, a boundary line (each corresponding to an edge of a rectangle) in the image shown in part (c) of FIG. 5.

Figure 6:
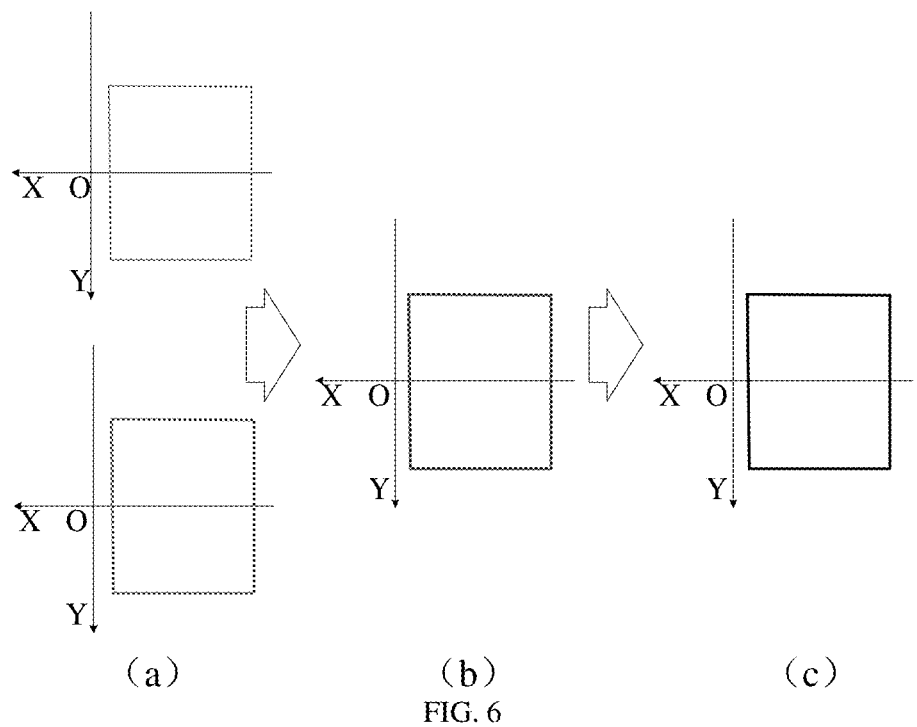
FIG. 6 is a schematic diagram of generating a second grayscale image according to an embodiment of the present disclosure.

In embodiments of the present disclosure, the boundary line of the second pseudo image may be as follows: a boundary line of a second projection generated by projecting the target point cloud of the second stacking object downward onto the XOY plane, for example, a boundary line (each corresponding to an edge line of a rectangle) in the upper image or the lower image in part (a) of FIG. 6; or a boundary line of a superimposed projection obtained by scaling the projections that are obtained by using the at least two projection resolutions and corresponding to the target point cloud of the second stacking object to a uniform size and superimposing the projections, for example, a boundary line (each corresponding to an edge line of a rectangle) in the image shown in part (b) of FIG. 6; or a boundary line of the second grayscale image, for example, a boundary line (each corresponding to an edge line of a rectangle) in the image shown in part (c) of FIG. 6.

In embodiments of the present disclosure, lines are extracted from the first pseudo image and the second pseudo image by using the probabilistic Hough transform line detection algorithm, to determine the boundary lines of the first pseudo image and the second pseudo image, so that a detection speed can be increased and computing resource consumption can be reduced while ensuring detection accuracy.

Optionally, the boundary line of the first pseudo image includes a first boundary line of the first pseudo image, a third boundary line of the first pseudo image, a fifth boundary line of the first pseudo image, and a seventh boundary line of the first pseudo image.

The boundary line of the second pseudo image includes a second boundary line of the second pseudo image, a fourth boundary line of the second pseudo image, a sixth boundary line of the second pseudo image, and an eighth boundary line of the second pseudo image.

In embodiments of the present disclosure, the determining the target point in the first pseudo image based on the boundary line of the first pseudo image includes:

determining a centerline of the first pseudo image based on the third boundary line of the first pseudo image and the fifth boundary line of the first pseudo image; and using an intersection between the centerline of the first pseudo image and the first boundary line of the first pseudo image as the target point in the first pseudo image.

The determining the target point in the second pseudo image based on the boundary line of the second pseudo image includes: determining a centerline of the second pseudo image based on the fourth boundary line of the second pseudo image and the sixth boundary line of the second pseudo image; and using an intersection between the centerline of the second pseudo image and the second boundary line of the second pseudo image as the target point in the second pseudo image.

In embodiments of the present disclosure, stacking objects with regular or irregular shapes may be used to complete stacking of stacking objects. The following uses stacking objects with a regular shape as an example.

According to the foregoing descriptions, boundary lines of a stacking object with a regular shape have a relationship of being either parallel or perpendicular to one another in a pseudo image. In view of this, in embodiments of the present disclosure, the third boundary line of the first pseudo image and the fifth boundary line of the first pseudo image are parallel to each other. The second boundary line of the second pseudo image and the fourth boundary line of the second pseudo image are parallel to each other. The third boundary line of the first pseudo image is perpendicular to the first boundary line of the first pseudo image, and the fifth boundary line of the first pseudo image is perpendicular to the first boundary line of the first pseudo image. The fourth boundary line of the second pseudo image is perpendicular to the second boundary line of the second pseudo image, and the sixth boundary line of the second pseudo image is perpendicular to the second boundary line of the second pseudo image.

The target point in the first pseudo image is a midpoint of the first boundary line of the first pseudo image; and the target point in the second pseudo image is a midpoint of the second boundary line of the second pseudo image.

The following provides a detailed description by using an example in which the first pseudo image is the first grayscale image and the second pseudo image is the second grayscale image.

Figure 7:
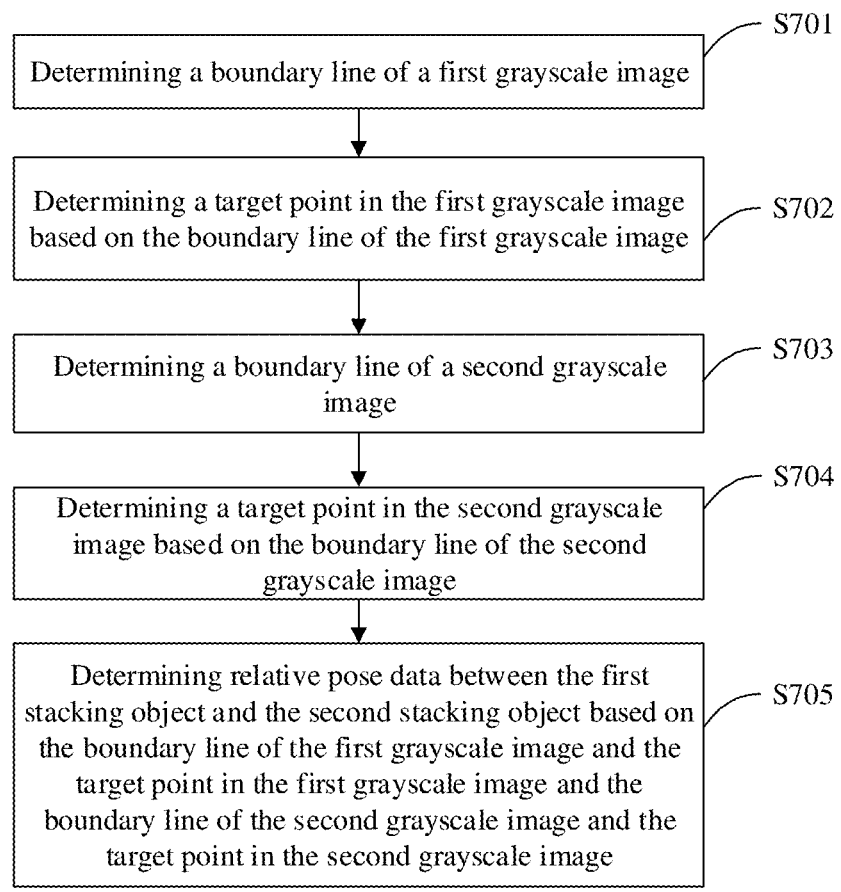
FIG. 7 is a flowchart of determining relative pose data between a first stacking object and a second stacking object according to an embodiment of the present disclosure.

In FIG. 7, the determining the relative pose data between the first stacking object and the second stacking object based on the first grayscale image and the second grayscale image may include the following steps:

Step S701: determining a boundary line of the first grayscale image;

Step S702: determining a target point in the first grayscale image based on the boundary line of the first grayscale image;

Step S703: determining a boundary line of the second grayscale image;

Step S704: determining a target point in the second grayscale image based on the boundary line of the second grayscale image; and Step S705: determining the relative pose data between the first stacking object and the second stacking object based on the boundary line of the first grayscale image and the target point in the first grayscale image and the boundary line of the second grayscale image and the target point in the second grayscale image.

In an example, the boundary line of the first grayscale image is extracted by using the probabilistic Hough transform line detection algorithm. The boundary line of the first grayscale image at least includes the first boundary line of the first grayscale image, the third boundary line of the first grayscale image, and the fifth boundary line of the first grayscale image. The boundary line of the second grayscale image at least includes the second boundary line of the second grayscale image, the fourth boundary line of the second grayscale image, and the sixth boundary line of the second grayscale image.

Figure 8:
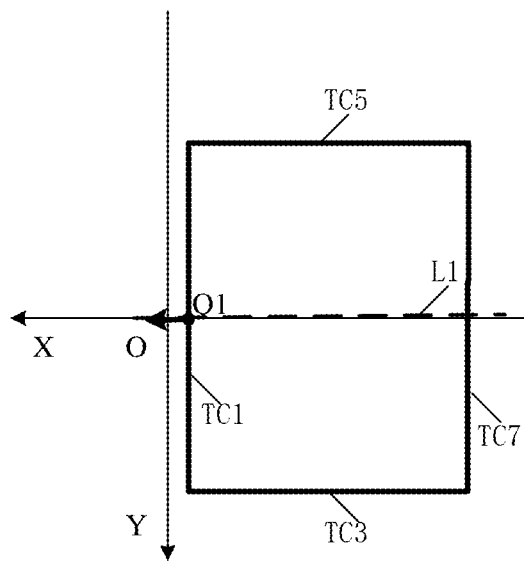
FIG. 8 is a schematic diagram of a first grayscale image according to an embodiment of the present disclosure.

As shown in FIG. 8, in some embodiments, the boundary line of the first grayscale image includes a first boundary line TC1 of the first grayscale image, a third boundary line TC3 of the first grayscale image, a fifth boundary line TC5 of the first grayscale image, and a seventh boundary line TC7 of the first grayscale image.

In some embodiments, the third boundary line TC3 of the first grayscale image is parallel to the fifth boundary line TC5 of the first grayscale image, and the first boundary line TC1 of the first grayscale image is parallel to the seventh boundary line TC7 of the first grayscale image.

Figure 9:
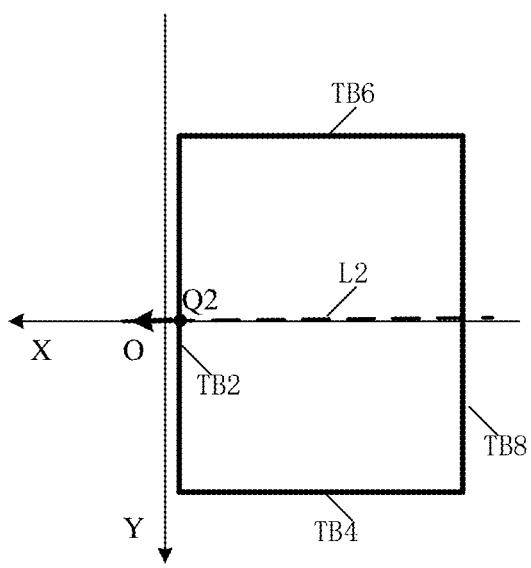
FIG. 9 is a schematic diagram of a second grayscale image according to an embodiment of the present disclosure.

As shown in FIG. 9, in some embodiments, the boundary line of the second grayscale image includes a second boundary line TB2 of the second grayscale image, a fourth boundary line TB4 of the second grayscale image, a sixth boundary line TB6 of the second grayscale image, and an eighth boundary line TB8 of the second grayscale image.

In some embodiments, the fourth boundary line TB4 of the second grayscale image and the sixth boundary line TB6 of the second grayscale image are parallel to each other, and the second boundary line TB2 of the second grayscale image and the eighth boundary line TB8 of the second grayscale image are parallel to each other.

In an example, the determining the target point in the first grayscale image based on the boundary line of the first grayscale image includes the following steps.

In FIG. 8, a centerline L1 of the first grayscale image is determined based on the third boundary line TC3 of the first grayscale image and the fifth boundary line TC5 of the first grayscale image. An intersection between the centerline L1 of the first grayscale image and the first boundary line TC1 of the first grayscale image is determined as a target point Q1 of the first grayscale image.

The determining the target point in the second grayscale image based on the boundary line of the second grayscale image includes the following steps.

In FIG. 9, a centerline L2 of the second grayscale image is determined based on the fourth boundary line TB4 of the second grayscale image and the sixth boundary line TB6 of the second grayscale image. An intersection between the centerline L2 of the second grayscale image and the second boundary line TB2 of the second grayscale image is determined as a target point Q2 of the second grayscale image.

In embodiments of the present disclosure, stacking objects with regular or irregular shapes may be used to complete stacking of stacking objects. The following uses stacking objects with a regular shape as an example.

According to the foregoing descriptions, boundary lines of a stacking object with a regular shape have a relationship of being either parallel or perpendicular to one another in a grayscale image. In view of this, in embodiments of the present disclosure, the third boundary line TC3 of the first grayscale image and the fifth boundary line TC5 of the first grayscale image are parallel to each other. The second boundary line TB2 of the second grayscale image and the fourth boundary line TB4 of the second grayscale image are parallel to each other. The third boundary line TC3 of the first grayscale image is perpendicular to the first boundary line TC1 of the first grayscale image, and the fifth boundary line TC5 of the first grayscale image is perpendicular to the first boundary line TC1 of the first grayscale image. The fourth boundary line TB4 of the second grayscale image is perpendicular to the second boundary line TB2 of the second grayscale image, and the sixth boundary line TB6 of the second grayscale image is perpendicular to the second boundary line TB2 of the second grayscale image.

In an example, the target point in the first grayscale image may be any point in the first grayscale image, such as a midpoint (as shown by Q1 in FIG. 8) of the first boundary line TC1 of the first grayscale image. The target point in the second grayscale image may be any point in the second grayscale image, such as a midpoint (as shown by Q2 in FIG. 9) of the second boundary line TB2 of the second grayscale image. A midpoint is used as an example in corresponding accompanying drawings of the present disclosure.

Step S701 and Step S702 are performed simultaneously with Step S703 and Step S704. Alternatively, Step S703 and Step S704 are performed before Step S701 and Step S702. Alternatively, Step S701 and Step S702 are performed before Step S703 and Step S704.

In some embodiments, pose data of the first stacking object is determined based on position information of the target point Q1 in the first grayscale image and angle information of the centerline L1 of the first grayscale image. Pose data of the second stacking object is determined based on position information of the target point Q2 in the second grayscale image and angle information of the centerline L2 of the second grayscale image. Then, a difference between the pose data of the first stacking object and the pose data of the second stacking object is calculated to obtain the relative pose data between the first stacking object and the second stacking object.

Figure 16:
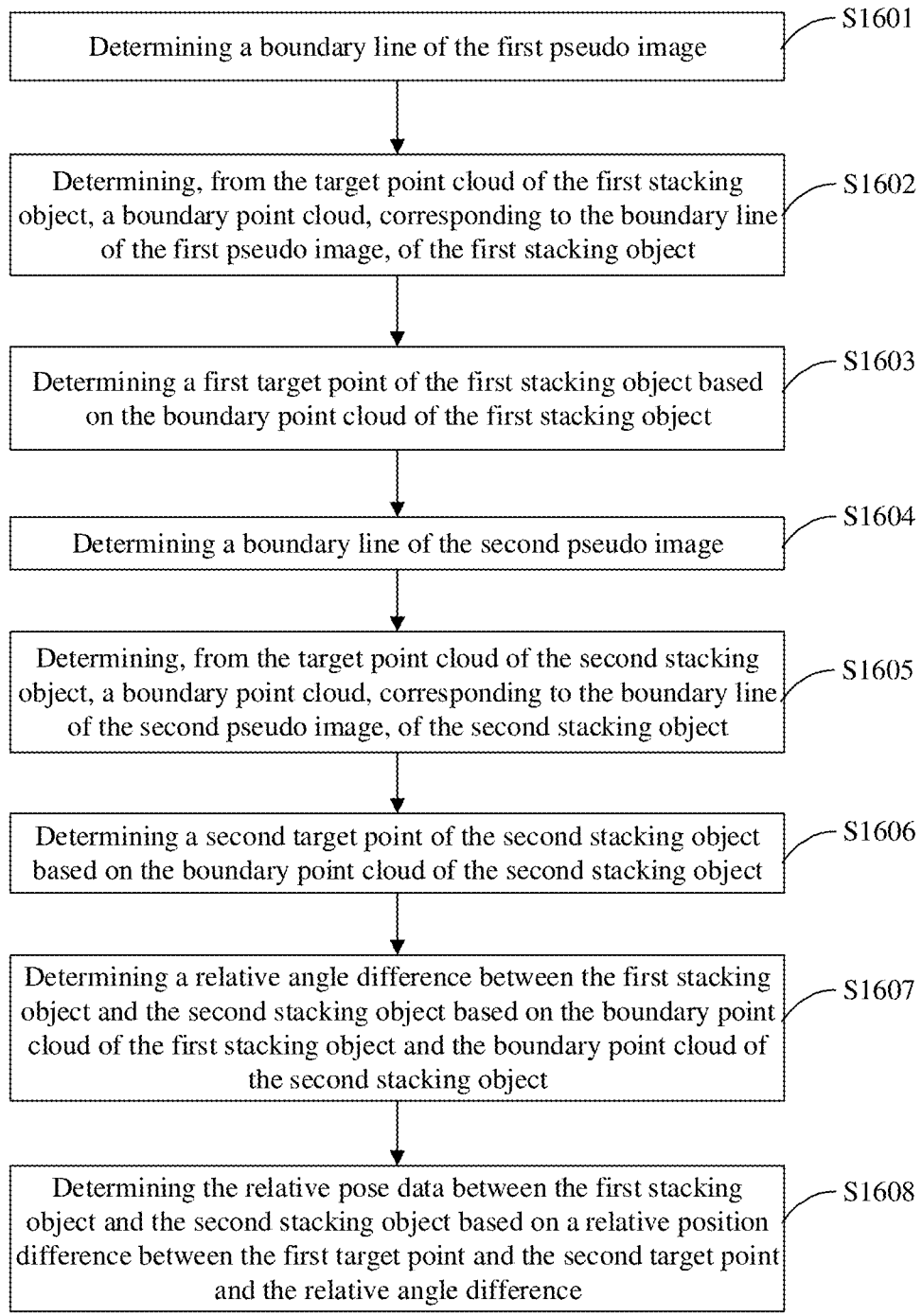
FIG. 16 is a flowchart of determining relative pose data between a first stacking object and a second stacking object according to an embodiment of the present disclosure.

In some embodiments, a method for determining the relative pose data between the first stacking object and the second stacking object is disclosed. As shown in FIG. 16, the method includes the following specific steps:

Step S1601: determining a boundary line of the first pseudo image;

Step S1602: determining, from the target point cloud of the first stacking object, a boundary point cloud, corresponding to the boundary line of the first pseudo image, of the first stacking object;

Step S1603: determining a first target point of the first stacking object based on the boundary point cloud of the first stacking object;

Step S1604: determining a boundary line of the second pseudo image;

Step S1605: determining, from the target point cloud of the second stacking object, a boundary point cloud, corresponding to the boundary line of the second pseudo image, of the second stacking object;

Step S1606: determining a second target point of the second stacking object based on the boundary point cloud of the second stacking object;

Step S1607: determining a relative angle difference between the first stacking object and the second stacking object based on the boundary point cloud of the first stacking object and the boundary point cloud of the second stacking object; and Step S1608: determining the relative pose data between the first stacking object and the second stacking object based on a relative position difference between the first target point and the second target point and the relative angle difference.

Figure 10:
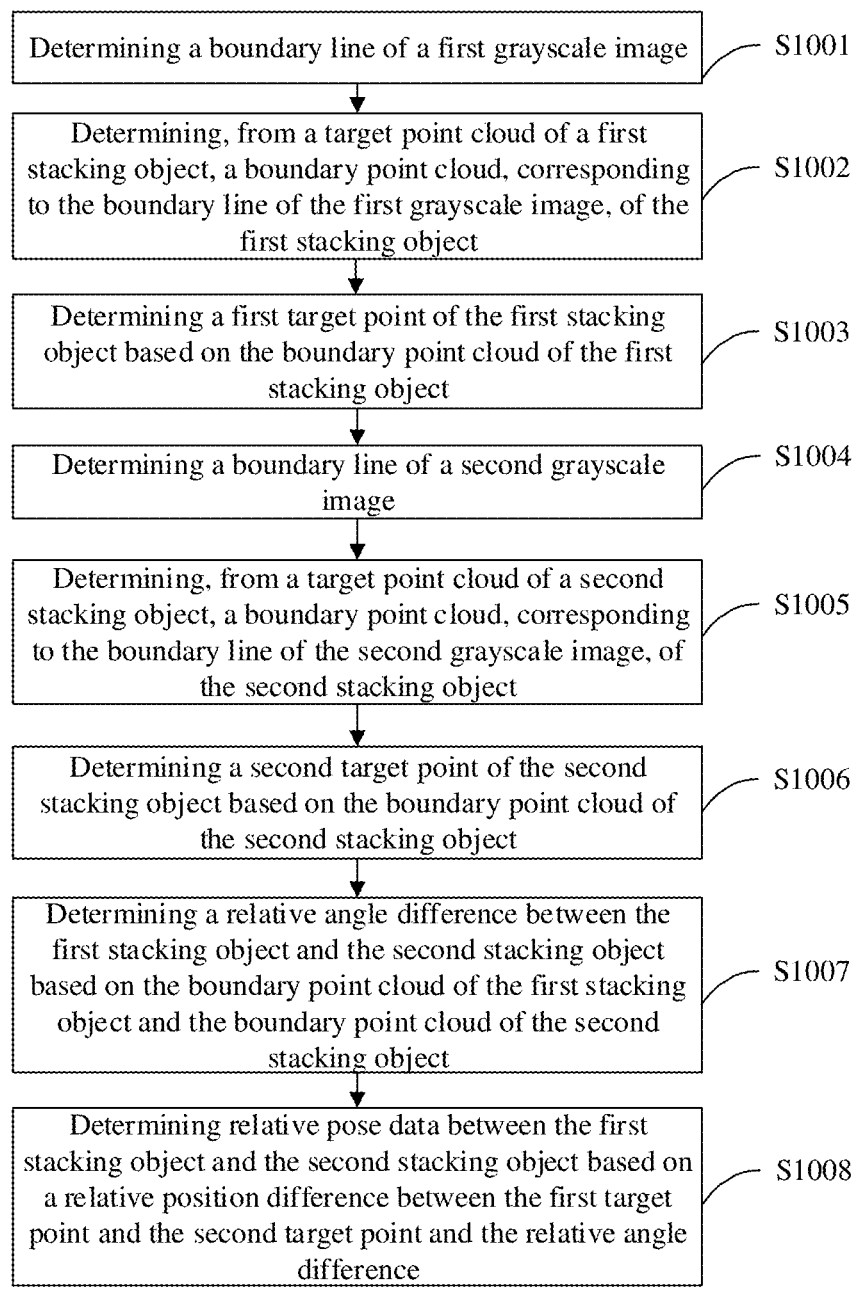
FIG. 10 is a flowchart of determining relative pose data between a first stacking object and a second stacking object according to an embodiment of the present disclosure.

The following provides a specific description by using an example in which the first pseudo image is the first grayscale image and the second pseudo image is the second grayscale image. As shown in FIG. 10, the determining the relative pose data between the first stacking object and the second stacking object may include the following steps:

Step S1001: determining a boundary line of the first grayscale image;

Step S1002: determining, from the target point cloud of the first stacking object, a boundary point cloud, corresponding to the boundary line of the first grayscale image, of the first stacking object;

Step S1003: determining a first target point of the first stacking object based on the boundary point cloud of the first stacking object;

Step S1004: determining a boundary line of the second grayscale image;

Step S1005: determining, from the target point cloud of the second stacking object, a boundary point cloud, corresponding the boundary line of the second grayscale image, of the second stacking object;

Step S1006: determining a second target point of the second stacking object based on the boundary point cloud of the second stacking object;

Step S1007: determining a relative angle difference between the first stacking object and the second stacking object based on the boundary point cloud of the first stacking object and the boundary point cloud of the second stacking object; and Step S1008: determining the relative pose data between the first stacking object and the second stacking object based on a relative position difference between the first target point and the second target point and the relative angle difference.

Step S1001 to Step S1003 are performed simultaneously with Step S1004 to Step S1006. Alternatively, Step S1004 to Step S1006 are performed before Step S1001 to Step S1003. Alternatively, Step S1001 to Step S1003 are performed before Step S1004 to Step S1006.

For Step S1002, the boundary point cloud, corresponding to the boundary line of the first grayscale image, of the first stacking object may be determined from the target point cloud of the first stacking object based on a first projection relationship.

The first projection relationship refers to a relationship between the target point cloud of the first stacking object and the first grayscale image.

For Step 1005, the boundary point cloud, corresponding to the boundary line of the second grayscale image, of the second stacking object may be determined from the target point cloud of the second stacking object based on a second projection relationship.

The second projection relationship refers to a relationship between the target point cloud of the second stacking object and the second grayscale image.

The following uses the first boundary line TC1 of the first grayscale image, the third boundary line TC3 of the first grayscale image, and the fifth boundary line TC5 of the first grayscale image as an example to describe how to respectively obtain a first boundary point cloud S1, a third boundary point cloud S3, and a fifth boundary point cloud S5 based on the first projection relationship.

For the first boundary line TC1 (for example, TC1 in FIG. 8) of the first grayscale image, the third boundary line TC3 (for example, TC3 in FIG. 8) of the first grayscale image, and the fifth boundary line TC5 (for example, TC5 in FIG. 8) of the first grayscale image, the first boundary point cloud S1 (for example, S1 in FIG. 11) corresponding to the first boundary line TC1 of the first grayscale image, the third boundary point cloud S3 (for example, S3 in FIG. 11) corresponding to the third boundary line TC3 of the first grayscale image, and the fifth boundary point cloud S5 (for example, S5 in FIG. 11) corresponding to the fifth boundary line TC5 of the first grayscale image may be determined based on the first projection relationship described above.

The following uses the second boundary line TB2 of the second grayscale image, the fourth boundary line TB4 of the second grayscale image, and the sixth boundary line TB6 of the second grayscale image as an example to describe how to respectively obtain a second boundary point cloud T2, a fourth boundary point cloud T4, and a sixth boundary point cloud T6 based on the second projection relationship.

For the second boundary line TB2 (as shown by TB2 in FIG. 9) of the second grayscale image, the fourth boundary line TB4 (as shown by TB4 in FIG. 9) of the second grayscale image, and the sixth boundary line TB6 (as shown by TB6 in FIG. 9) of the second grayscale image, the second boundary point cloud T2 (as shown by T2 in FIG. 11) corresponding to the second boundary line TB2 of the second grayscale image, the fourth boundary point cloud T4 (as shown by T4 in FIG. 11) corresponding to the fourth boundary line TB4 of the second grayscale image, and the sixth boundary point cloud T6 (as shown by T6 in FIG. 11) corresponding to the sixth boundary line TB6 of the second grayscale image may be determined based on the second projection relationship described above.

In embodiments of the present disclosure, distribution of boundary point clouds directly reflects a geometrical shape of a corresponding stacking object. For example, a point cloud with six rectangular faces may be generated for a cubic stacking object.

Figure 11:
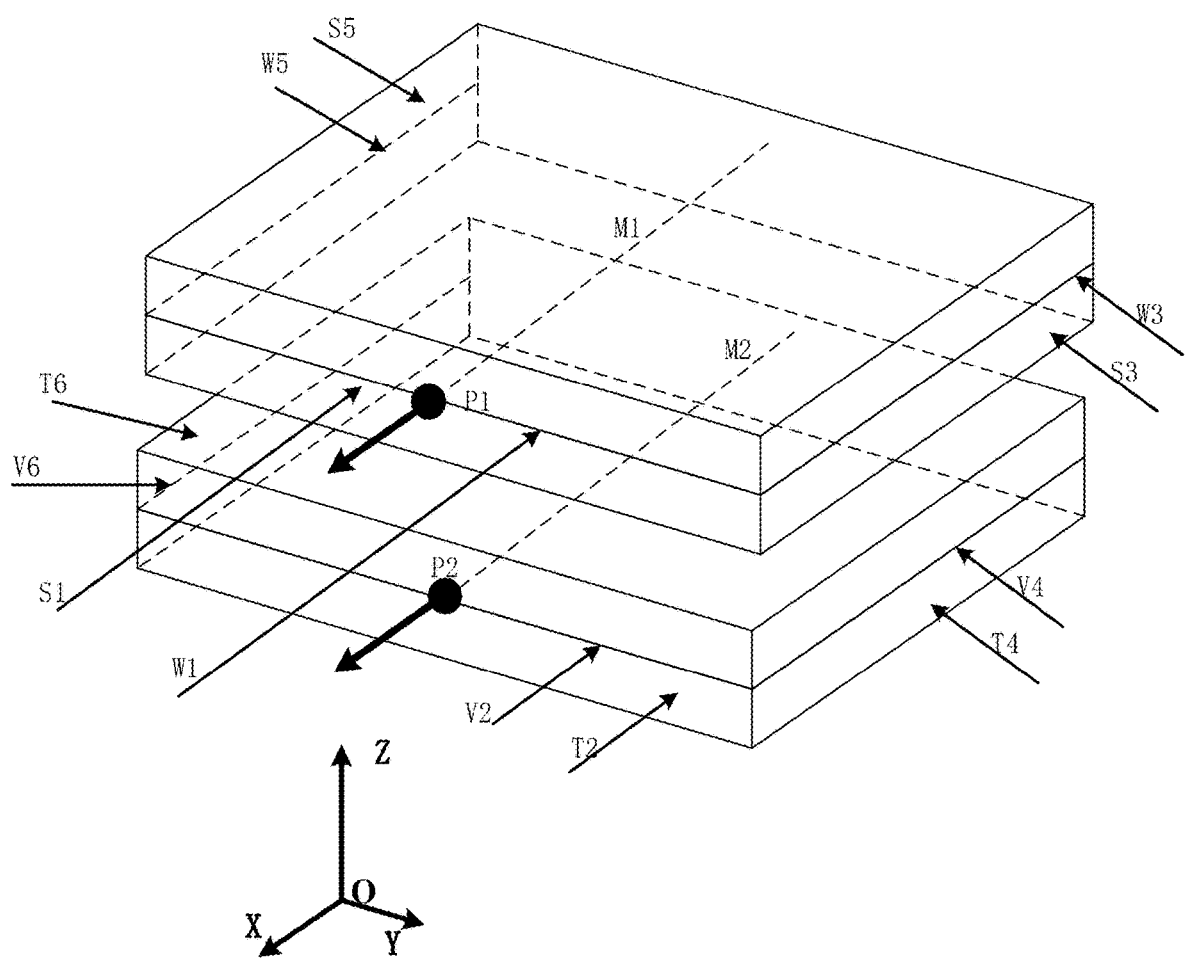
FIG. 11 is a schematic diagram of calculating a first target point and a second target point according to an embodiment of the present disclosure.

In FIG. 11, according to a geometrical shape (e.g., a rectangular shape) of the first stacking object, the first boundary point cloud S1, the third boundary point cloud S3, and the fifth boundary point cloud S5 are distributed on respective rectangular faces of the first stacking object. According to a geometrical shape of the second stacking object, the second boundary point cloud T2, the fourth boundary point cloud T4, and the sixth boundary point cloud T6 are distributed on respective rectangular faces of the second stacking object.

In FIG. 11, fitting is performed, by using the least squares method, on the first boundary point cloud S1 distributed on the corresponding rectangular face, to obtain a first edge line W1. Fitting is performed, by using the least squares method, on the third boundary point cloud S3 distributed on the corresponding rectangular face, to obtain a third edge line W3. Fitting is performed, by using the least squares method, on the fifth boundary point cloud S5 distributed on the corresponding rectangular face, to obtain a fifth edge line W5.

In FIG. 11, fitting is performed, by using the least squares method, on the second boundary point cloud T2 distributed on the corresponding rectangular face, to obtain a second edge line V2. Fitting is performed, by using the least squares method, on the fourth boundary point cloud T4 distributed on the corresponding rectangular face, to obtain a fourth edge line V4. Fitting is performed, by using the least squares method, on the sixth boundary point cloud T6 distributed on the corresponding rectangular face, to obtain a sixth edge line V6.

The performing, by using the least squares method, fitting on the third boundary point cloud S3 distributed on the rectangular face, to obtain the third edge line W3 is described below by using the third boundary point cloud S3 as an example.

For example, a line $y=mx+b$ is found on the rectangular face, where m denotes a slope, and b denotes an intercept, such that the line most closely approximates the third boundary point cloud S3 distributed on the rectangular face. The goal of the least squares method is to find values of m and b that minimize a sum of squares of vertical distances (i.e., errors) from all points (i.e., all points in the third boundary point cloud S3 distributed on the rectangular face) to the line. The line is determined by minimizing the sum of squares of the vertical distances (i.e., errors) from all the points to the line, and the determined line is used as the third edge line W3.

It should be noted that, edge lines of the other boundary point clouds may be determined using a same method as that applied to the third boundary point cloud.

In embodiments of the present disclosure, the first target point may be any point on the first stacking object, such as a midpoint (for example, P1 in FIG. 11) of the first edge line W1 of the first stacking object. The second target point may be any point on the second stacking object, such as a midpoint (for example, P2 in FIG. 11) of the second edge line V2 of the second stacking object. A midpoint is used as an example in corresponding accompanying drawings of the present disclosure.

In an example, in embodiments of the present disclosure, the first target point (for example, the first target point P1 in FIG. 11) and the second target point (the second target point P2 in FIG. 11) may be determined specifically in the following manner.

Figure 17:
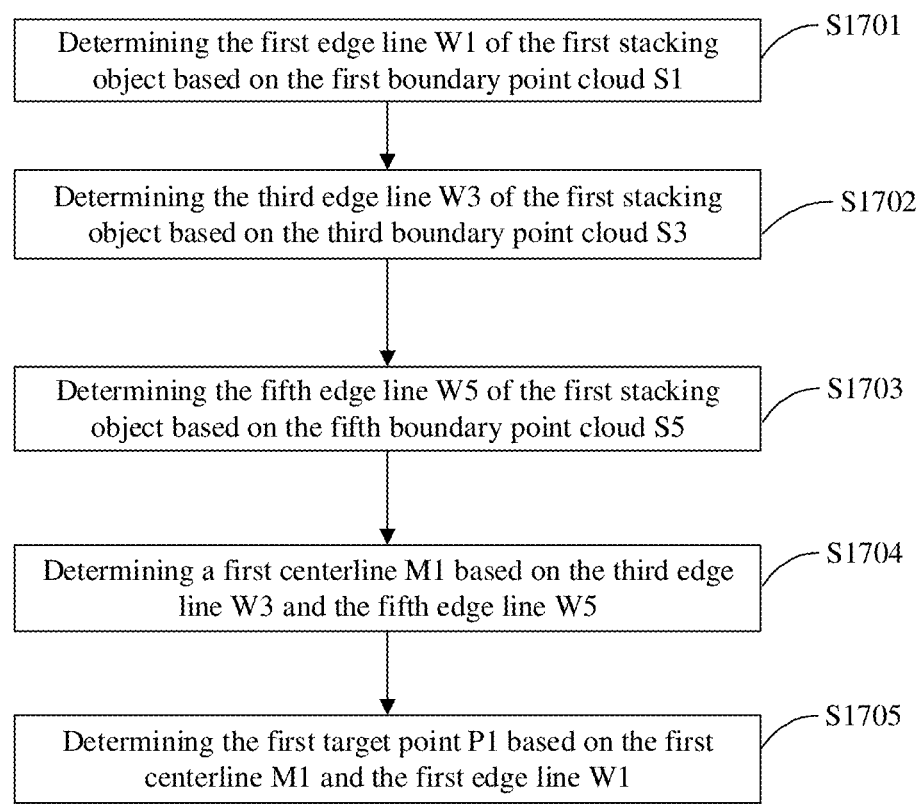
FIG. 17 is a flowchart of determining a first target point of a first stacking object according to an embodiment of the present disclosure.

Combining FIG. 11 and FIG. 17, Step S1701: determining the first edge line W1 of the first stacking object based on the first boundary point cloud S1; Step S1702: determining the third edge line W3 of the first stacking object based on the third boundary point cloud S3; Step S1703: determining the fifth edge line W5 of the first stacking object based on the fifth boundary point cloud S5; Step S1704: determining a first centerline M1 based on the third edge line W3 and the fifth edge line W5; Step S1705: determining the first target point P1 based on the first centerline M1 and the first edge line W1.

Figure 18:
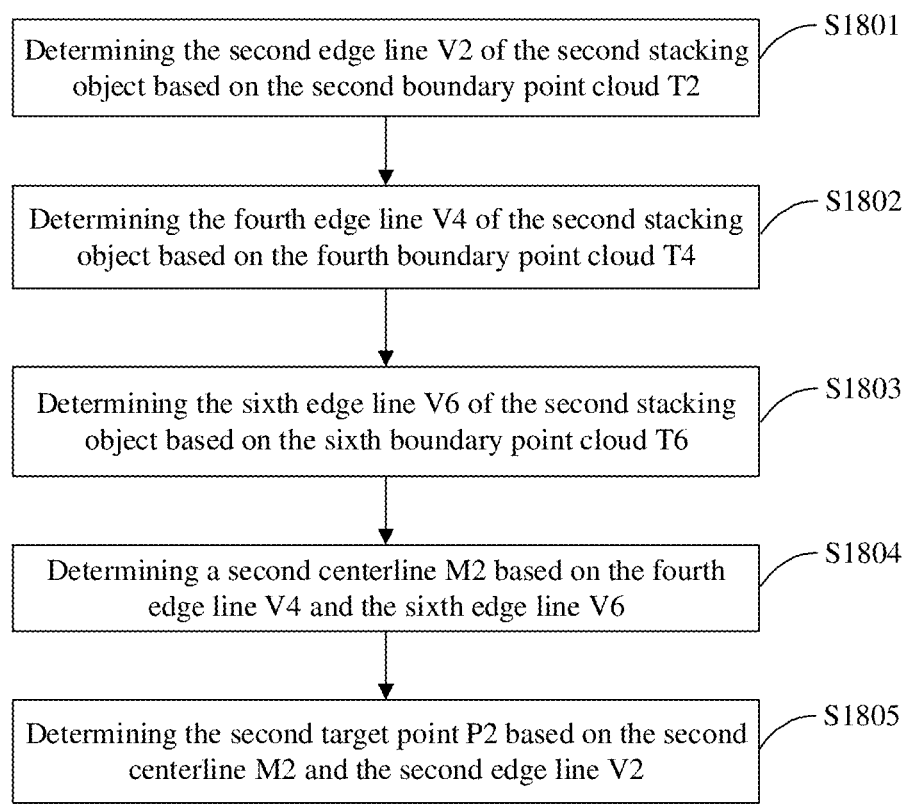
FIG. 18 is a flowchart of determining a second target point of a second stacking object according to an embodiment of the present disclosure.

Combining FIG. 11 and FIG. 18, Step S1801: determining the second edge line V2 of the second stacking object based on the second boundary point cloud T2; Step S1802: determining the fourth edge line V4 of the second stacking object based on the fourth boundary point cloud T4; Step S1803: determining the sixth edge line V6 of the second stacking object based on the sixth boundary point cloud T6; Step S1804: determining a second centerline M2 based on the fourth edge line V4 and the sixth edge line V6; Step S1805: determining the second target point P2 based on the second centerline M2 and the second edge line V2.

The relative pose data involved in the embodiments includes a relative position difference and a relative angle difference. The relative position difference may be determined based on a position difference between the first target point P1 and the second target point P2.

The following describes in detail several manners of determining the relative angle difference.

Manner 1

Figure 19:
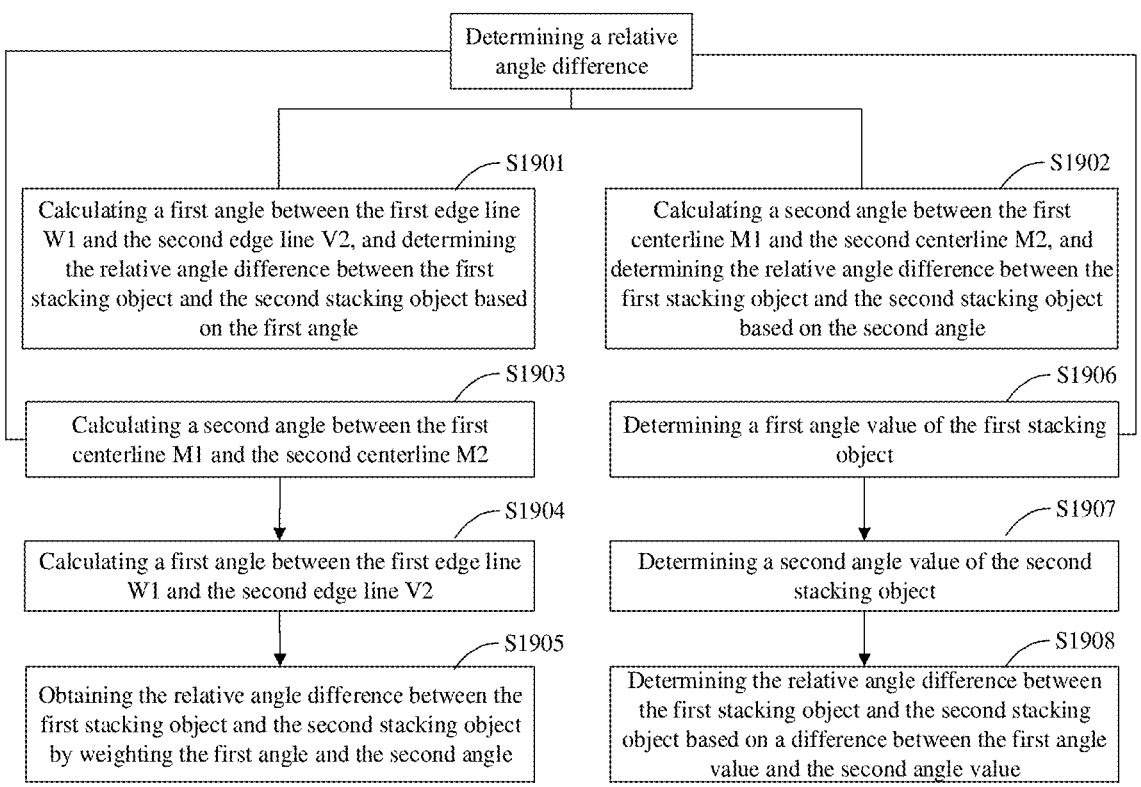
FIG. 19 is a flowchart of determining a relative angle difference according to an embodiment of the present disclosure.

As shown in FIG. 19, Step S1901: calculating a first angle between the first edge line W1 and the second edge line V2, and determining the relative angle difference between the first stacking object and the second stacking object based on the first angle.

In FIG. 11, the first angle is an angle in the XOY plane in the 3D coordinate system, and the first angle is an angle formed by projecting both the first edge line W1 and the second edge line V2 onto the XOY plane.

Optionally, the first angle may alternatively be an angle between the third edge line W3 and the fourth edge line V4, or an angle between the fifth edge line W5 and the sixth edge line V6, or an angle between the seventh edge line and the eighth edge line.

Manner 2

As shown in FIG. 19, Step S1902: calculating a second angle between the first centerline M1 and the second centerline M2, and determining the relative angle difference between the first stacking object and the second stacking object based on the second angle.

In FIG. 11, the second angle is an angle in the XOY plane in the 3D coordinate system, and the second angle is an angle formed by projecting both the first centerline M1 and the second centerline M2 onto the XOY plane.

Manner 3

As shown in FIG. 19, Step S1903: calculating a second angle between the first centerline M1 and the second centerline M2;

Step S1904: calculating a first angle between the first edge line W1 and the second edge line V2; and Step S1905: obtaining the relative angle difference between the first stacking object and the second stacking object by weighting the first angle and the second angle.

Figure 12:
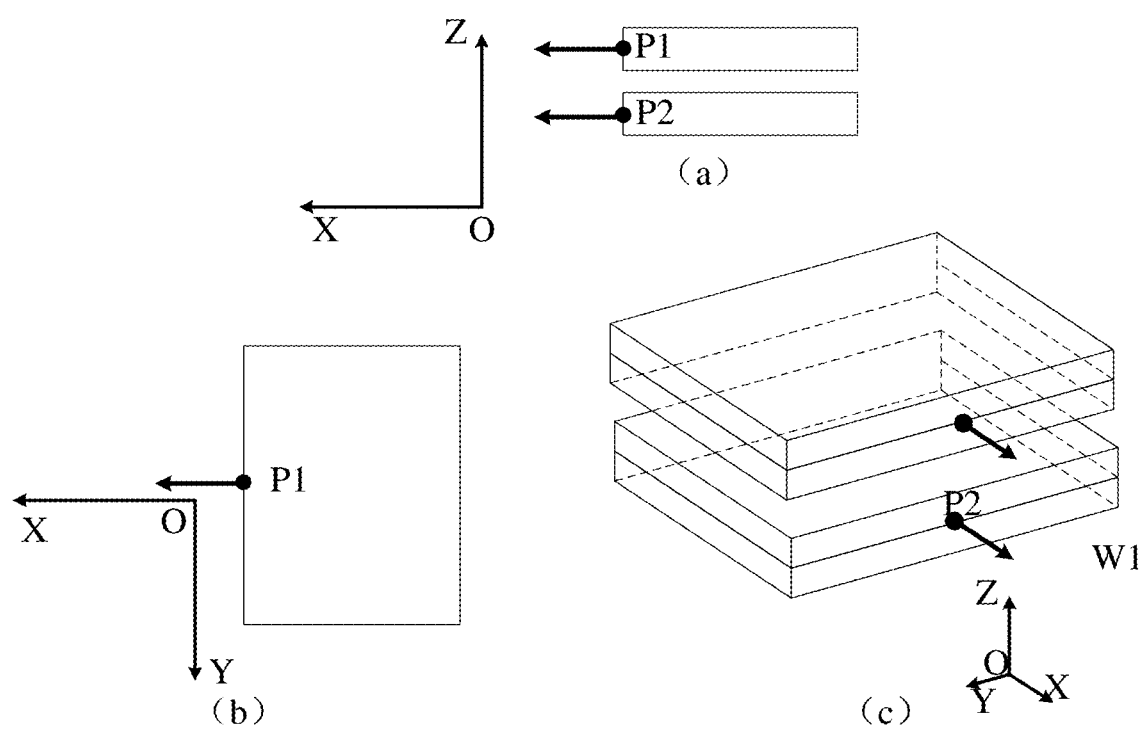
FIG. 12 is a schematic diagram of a direction indicated by an arrow at a first target point and a direction indicated by an arrow at a second target point from different perspectives according to an embodiment of the present disclosure.

In FIG. 11, the relative angle difference is obtained by weighting the second angle between the first centerline M1 and the second centerline M2, and the first angle between the first edge line W1 and the second edge line V2. Allocation of a weighted ratio may be adjusted according to an actual situation. For example, when clarity of the boundary point clouds corresponding to the first edge line W1 and the second edge line V2 is higher, a weighted ratio of the first angle may be increased. In FIG. 11, the angle difference may be obtained by using a difference between a direction indicated by the arrow at the root of the upper arrow, namely, the arrow at the first target point P1, and a direction indicated by the arrow at the root of the lower arrow, namely, the arrow at the second target point P2. In addition, in parts (a) to (c) in FIG. 12, the direction indicated by the arrow at the first target point and the direction indicated by the arrow at the second target point are represented from a perspective different from that in FIG. 11.

Manner 4

As shown in FIG. 19, Step S1906: determining a first angle value of the first stacking object;

Step S1907: determining a second angle value of the second stacking object; and

Step S1908: determining the relative angle difference between the first stacking object and the second stacking object based on a difference between the first angle value and the second angle value.

The determining the first angle value of the first stacking object may include:

determining the first angle value of the first stacking object based on an angle of the first edge line W1; or determining the first angle value of the first stacking object based on an angle of the first centerline M1; or obtaining the first angle value of the first stacking object by weighting the angle of the first centerline M1 and the angle of the first edge line W1, where a weighted ratio may be adjusted according to an actual situation. For example, when clarity of the boundary point cloud data corresponding to the first edge line W1 is higher, the weighted ratio of the angle of the first edge line W1 may be increased appropriately.

Similarly, the determining the second angle value of the second stacking object may include:

determining the second angle value of the second stacking object based on an angle of the second edge line V2; or determining the second angle value of the second stacking object based on an angle of the second centerline M2; or obtaining the second angle value of the second stacking object by weighting the angle of the second centerline M2 and the angle of the second edge line V2, where a weighted ratio may be adjusted according to an actual situation. For example, when clarity of the boundary point cloud data corresponding to the second edge line V2 is higher, the weighted ratio of the angle of the second edge line V2 may be increased appropriately.

In addition, it should be noted that, the first angle value of the first stacking object and the second angle value of the second stacking object may be flexibly selected according to an actual situation. For example, when the first angle value of the first stacking object is determined based on the angle of the first edge line W1, the second angle value of the second stacking object may be determined based on the angle of the second centerline M2.

In embodiments of the present disclosure, the boundary line of the first grayscale image is obtained in the following manner. A line is extracted from the first grayscale image by using a probabilistic Hough transform line detection algorithm, and the boundary line of the first grayscale image is determined from extracted lines based on a size of the first stacking object. The boundary line of the second grayscale image is obtained in the following manner. A line is extracted from the second grayscale image by using the probabilistic Hough transform line detection algorithm, and the boundary line of the second grayscale image is determined from extracted lines based on a size of the second stacking object.

Herein, the probabilistic Hough transform line detection algorithm (Probabilistic Hough Transform) reduces a calculation amount by randomly selecting parameters of an edge point in parameter space.

In a rectangular coordinate system, a line in the first grayscale image may be represented in polar coordinates as $r = x\cos\theta + y\sin\theta$, where r denotes a distance from the line to an origin and θ denotes a direction angle of the line. Each edge point in the first grayscale image corresponds to a sine curve in the parameter space, and intersections of these curves represent a line passing through these points. The probabilistic Hough transform involves randomly selecting an edge point, calculating a curve corresponding to the edge point in the parameter space, and then finding intersections of these curves to determine parameters of a line.

Herein, a size of the first stacking object may include a length, a width, and a height, which are used as a basis for selecting and matching a line from extracted lines, to determine the boundary line of the first grayscale image.

In embodiments of the present disclosure, a conventional probabilistic Hough transform line detection algorithm may be used to extract a line from a grayscale image. In scenarios with simple structures of the first stacking object and the second stacking object and few environmental interferences, the Hough transform line detection may also be used.

However, to adapt to a first stacking object and a second stacking object with more complex structures and improve detection accuracy, the probabilistic Hough transform line detection algorithm has been improved in embodiments of the present disclosure. Specifically, the extracting a line from a grayscale image (i.e., the first grayscale image or the second grayscale image) by using the improved probabilistic Hough transform line detection algorithm may include the following steps.

Pixels in the grayscale image are sorted by grayscale values to obtain a pixel sequence set, where the pixel sequence set includes a plurality of pixel sequences, with each pixel sequence including pixels corresponding to a same grayscale value. According to the sorting, a pixel sequence is sequentially selected as a current pixel sequence, and a pixel is randomly selected from the current pixel sequence to find a line with a highest probability within an angle range, where a quantity of pixels on the line meets a line length requirement and a sum of grayscale values on the line is maximized. If a distance between the found line and the extracted line is greater than or equal to a maximum line spacing threshold, the line is extracted, the current pixel sequence is removed from the pixel sequence set, and a next pixel sequence is selected as a current pixel sequence, until the pixel sequence set is empty.

The angle range described above, the maximum line spacing threshold described above, and a quantity of lines may all be line parameters selected in parameter space by the probabilistic Hough transform line detection algorithm.

For a pixel in the current pixel sequence, a set of line parameters (r and θ in a polar coordinate system) corresponding to the pixel are calculated, and voted in the parameter space. The angle range is used to limit a direction along which a line is searched for. Setting of the angle range is required to be adjusted depending on specific application scenarios.

In an example, parameters of a line include at least one of a pixel distance resolution, an angle resolution, an angle range, a minimum line length threshold, a maximum line spacing threshold, or a quantity of lines.

Specifically, (1) all pixels in the grayscale image are sorted in descending order of grayscale values to form a pixel sequence set. (2) a pixel sequence is sequentially selected from the pixel sequence set according to the descending order of grayscale values, and a pixel is randomly selected from the pixel sequence. (3) a line with a highest probability within an angle range is found within selected pixels, where a quantity of pixels on the line meets a line length threshold requirement (for example, the minimum line length threshold described above) and a sum of grayscale values on the line is maximized. (4) all pixels on the line are found, and whether a distance between the found line and an extracted line satisfies the maximum line spacing threshold is determined; and if no, (2) is performed; or if yes, (5) is performed. (5) the line is selected, and pixels on the line are removed from pixels to be selected. (6) whether all pixels in the pixel sequence set are traversed is determined; if yes, a selected line set is returned; otherwise, whether a quantity of selected lines meets a requirement is determined; and if no, (2) is performed; if yes, a selected line set is returned.

A manner of determining the boundary line of the second grayscale image is the same as a manner of determining the boundary line of the first grayscale image, and details are not described herein again.

The "comparing the relative pose data with the threshold to determine the alignment state between the first stacking object and the second stacking object" in Step S407 is described below in detail with reference to embodiments.

In embodiments of the present disclosure, the alignment state between the first stacking object and the second stacking object may be determined based on the relative pose data and the threshold. When the relative pose data is greater than or equal to the threshold, it is determined that the alignment state is misaligned. When the relative pose data is less than the threshold, it is determined that the alignment state is aligned.

In an example, when the relative pose data is greater than or equal to the threshold, the method further includes the following steps.

An automated guided forklift is controlled based on the relative pose data to adjust a pose.

A target point cloud of the first stacking object and a target point cloud of the second stacking object are re-acquired by using the sensor.

The relative pose data is re-determined based on the target point cloud of the first stacking object and the target point cloud of the second stacking object.

The alignment state is re-determined based on the relative pose data until the relative pose data is less than the threshold.

In an example, when the relative pose data is less than the threshold, the method further includes the following steps.

The automated guided forklift is controlled to place the first stacking object onto the second stacking object to complete stacking.

The threshold is used to measure whether the automated guided forklift is controlled to perform stacking on the first stacking object and the second stacking object, and the threshold may be set based on precision of alignment between the first stacking object and the second stacking object.

Figure 13:
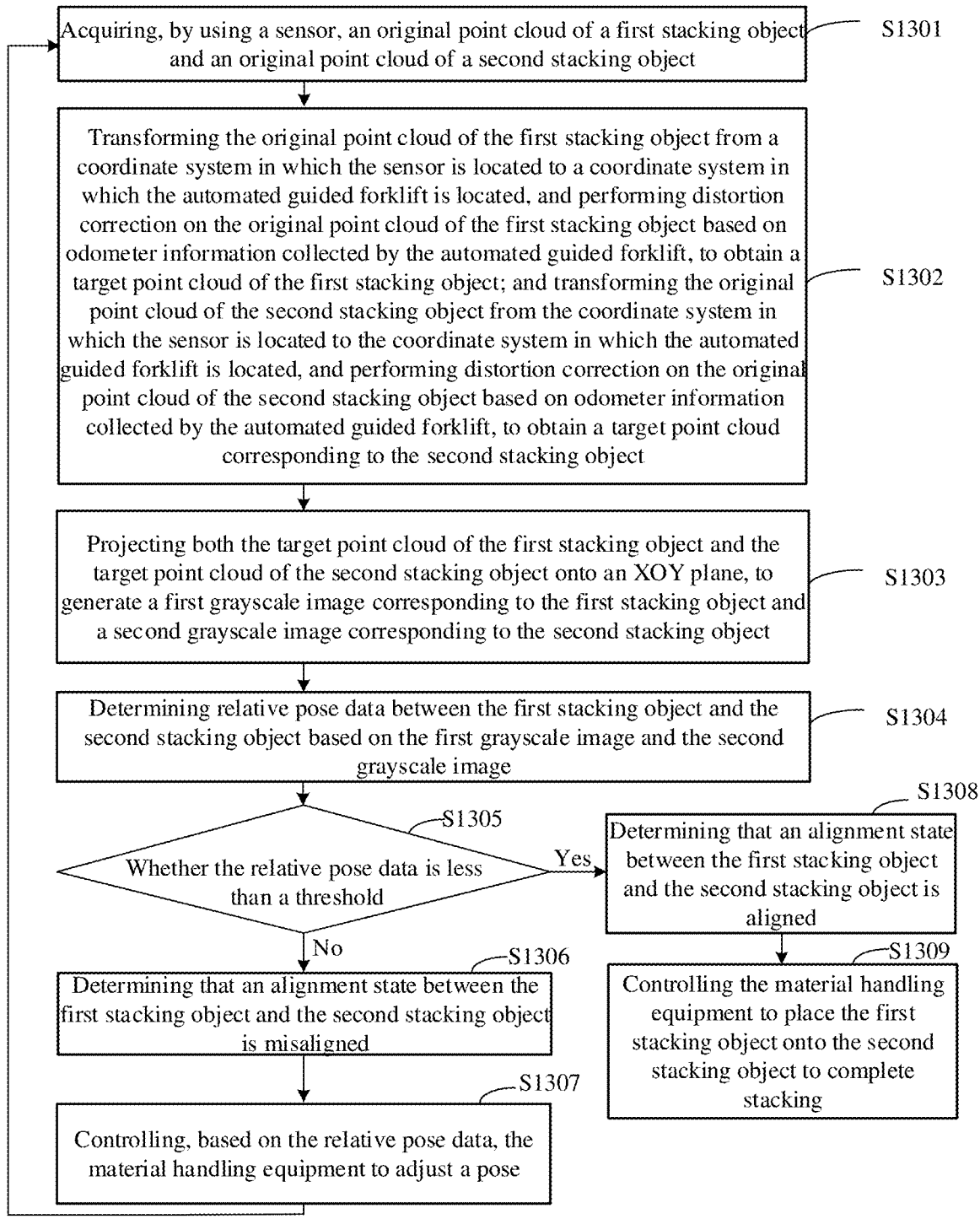
FIG. 13 is a flowchart of a method for determining an alignment state according to an embodiment of the present disclosure.

When the first pseudo image is the first grayscale image, and the second pseudo image is the second grayscale image, the following describes, with reference to an actual application scenario, an implementation of the method provided in embodiments of the present disclosure. As shown in FIG. 13, an execution body is an automated guided forklift.

In FIG. 13, the determining the relative pose data between the first stacking object and the second stacking object based on the first grayscale image and the second grayscale image is used as an example. The method includes the following steps:

Step S1301: acquiring, by using the sensor, an original point cloud of the first stacking object and an original point cloud of the second stacking object;

Step S1302: transforming the original point cloud of the first stacking object from a coordinate system in which the sensor is located to a coordinate system in which the automated guided forklift is located, and performing distortion correction on the original point cloud of the first stacking object based on odometer information collected by the automated guided forklift, to obtain a target point cloud of the first stacking object; and transforming the original point cloud of the second stacking object from the coordinate system in which the sensor is located to the coordinate system in which the automated guided forklift is located, and performing distortion correction on the original point cloud of the second stacking object based on odometer information collected by the automated guided forklift, to obtain a target point cloud corresponding to the second stacking object;

Step S1303: projecting both the target point cloud of the first stacking object and the target point cloud of the second stacking object onto an XOY plane, to generate a first grayscale image corresponding to the first stacking object and a second grayscale image corresponding to the second stacking object;

Step S1304: determining relative pose data between the first stacking object and the second stacking object based on the first grayscale image and the second grayscale image;

Step S1305: determining whether the relative pose data is less than a threshold;

Step S1306: when the relative pose data is greater than or equal to the threshold, determining that an alignment state between the first stacking object and the second stacking object is misaligned, and performing Step S1307;

Step S1307: controlling, based on the relative pose data, the automated guided forklift to adjust a pose, and performing Step S1301 to Step S1305 until a relative pose data is less than the threshold;

Step S1308: when the relative pose data is less than the threshold, determining that the alignment state between the first stacking object and the second stacking object is aligned; and Step S1309: controlling the automated guided forklift to place the first stacking object onto the second stacking object to complete stacking.

Figure 14:
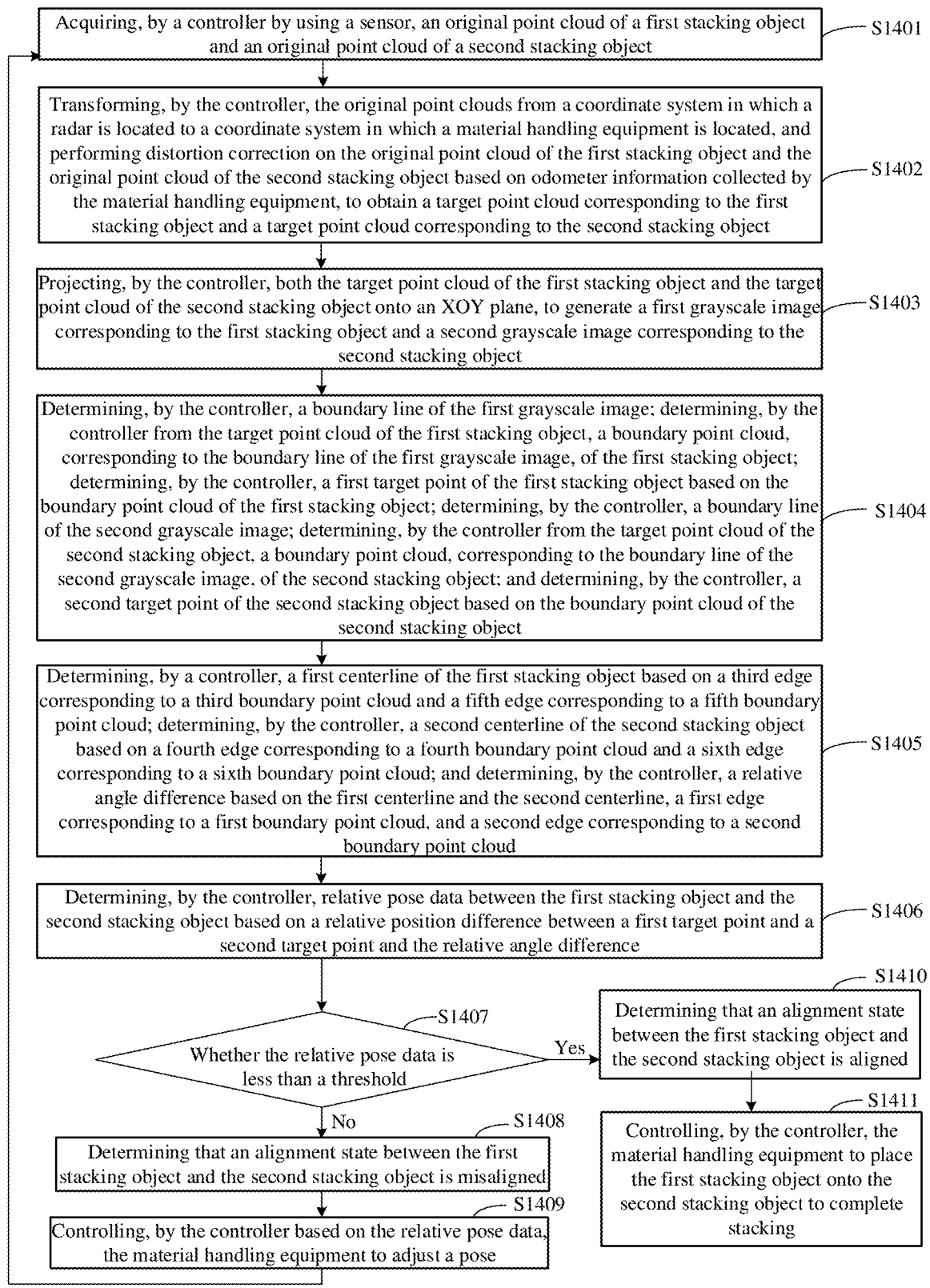
FIG. 14 is a flowchart of a method for determining an alignment state according to an embodiment of the present disclosure.

When the first pseudo image is the first grayscale image, and the second pseudo image is the second grayscale image, the following describes, with reference to an actual application scenario, an implementation of the method provided in embodiments of the present disclosure. As shown in FIG. 14, an execution body is an automated guided forklift, and the method includes the following steps:

Step S1401: acquiring, by using the sensor, an original point cloud of the first stacking object and an original point cloud of the second stacking object;

Step S1402: transforming the original point cloud of the first stacking object from a coordinate system in which the sensor is located to a coordinate system in which the automated guided forklift is located, and performing distortion correction on the original point cloud of the first stacking object based on odometer information collected by the automated guided forklift, to obtain a target point cloud of the first stacking object; and transforming the original point cloud of the second stacking object from the coordinate system in which the sensor is located to the coordinate system in which the automated guided forklift is located, and performing distortion correction on the original point cloud of the second stacking object based on odometer information collected by the automated guided forklift, to obtain a target point cloud corresponding to the second stacking object;

Step S1403: projecting both the target point cloud of the first stacking object and the target point cloud of the second stacking object onto an XOY plane, to generate a first grayscale image corresponding to the first stacking object and a second grayscale image corresponding to the second stacking object;

Step S1404: determining a boundary line of the first grayscale image; determining, from the target point cloud of the first stacking object, a boundary point cloud, corresponding to the boundary line of the first grayscale image, of the first stacking object; determining a first target point of the first stacking object based on the boundary point cloud of the first stacking object; determining a boundary line of the second grayscale image; determining, from the target point cloud of the second stacking object, a boundary point cloud, corresponding to the boundary line of the second grayscale image, of the second stacking object; and determining a second target point of the second stacking object based on the boundary point cloud of the second stacking object;

Step S1405: determining a first centerline of the first stacking object based on the third edge line corresponding to the third boundary point cloud and the fifth edge line corresponding to the fifth boundary point cloud; determining a second centerline of the second stacking object based on the fourth edge line corresponding to the fourth boundary point cloud and the sixth edge line corresponding to the sixth boundary point cloud; and determining a relative angle difference based on the first centerline and the second centerline, the first edge line corresponding to the first boundary point cloud, and the second edge line corresponding to the second boundary point cloud;

Step S1406: determining the relative pose data between the first stacking object and the second stacking object based on a relative position difference between the first target point and the second target point and the relative angle difference;

Step S1407: determining whether the relative pose data is less than a threshold;

Step S1408: when the relative pose data is greater than or equal to the threshold, determining that an alignment state between the first stacking object and the second stacking object is misaligned, and performing Step S1409;

Step S1409: controlling, based on the relative pose data, the automated guided forklift to adjust a pose, and performing Step S1401 to Step S1407 until a relative pose data is less than the threshold;

Step S1410: when the relative pose data is less than the threshold, determining that the alignment state between the first stacking object and the second stacking object is aligned; and Step S1411: controlling the automated guided forklift to place the first stacking object onto the second stacking object to complete stacking.

In embodiments of the present disclosure, the controlling, based on the relative pose data, the automated guided forklift to adjust the pose may include: controlling the automated guided forklift to adjust a pose of the first stacking object on a fork and/or controlling the automated guided forklift to adjust a pose of a chassis (that is, adjusting a pose of the automated guided forklift relative to the second stacking object).

In embodiments of the present disclosure, the automated guided forklift may alternatively be controlled to adjust the pose based on an instant at which the sensor and the odometer mounted on the automated guided forklift collects data and a controller processes data. Specifically:

Pose adjustment information of the automated guided forklift is determined based on the relative pose data. Odometer information collected by the automated guided forklift at a target instant (that is, an instant at which the target point cloud is acquired) is acquired. Pose adjustment information corresponding to a current instant is determined based on the odometer information corresponding to the target instant, pose adjustment information corresponding to the target instant, and odometer information corresponding to the current instant. The automated guided forklift is controlled to adjust the pose based on the pose adjustment information corresponding to the current instant.

Herein, the pose adjustment information may refer to information for adjusting a position and an orientation of the automated guided forklift. The current instant is different from the target instant, and the target instant is generally a historical instant relative to the current instant.

For example, the pose adjustment information corresponding to the current instant may be determined according to the following formula:

$$E_n\hat{} = H_{n+1}^{-1} \cdot H_n \cdot E_n$$

$H_n$ denotes the odometer information corresponding to the target instant, $E_n$ denotes the pose adjustment information corresponding to the target instant, $H_{n+1}^{-1}$ denotes the odometer information corresponding to the current instant, and $E_n\hat{}$ denotes the pose adjustment information corresponding to the current instant.

According to the present disclosure, in consideration of time being not synchronized between data obtained after being processed by the controller and data collected by the sensor and the odometer mounted on the automated guided forklift, to ensure that the data obtained after being processed by the controller is pose adjustment information corresponding to a current instant, the pose adjustment information corresponding to the current instant is determined based on odometer information corresponding to an instant of the collection, pose adjustment information corresponding to a historical instant (that is, pose adjustment information determined based on the relative pose data), and odometer information corresponding to the current instant, so as to ensure that automated guided forklift accurately adjusts its pose based on the pose adjustment information corresponding to the current instant, thereby ensuring precision of alignment between the first stacking object and the second stacking object at the current instant.

Figure 15:
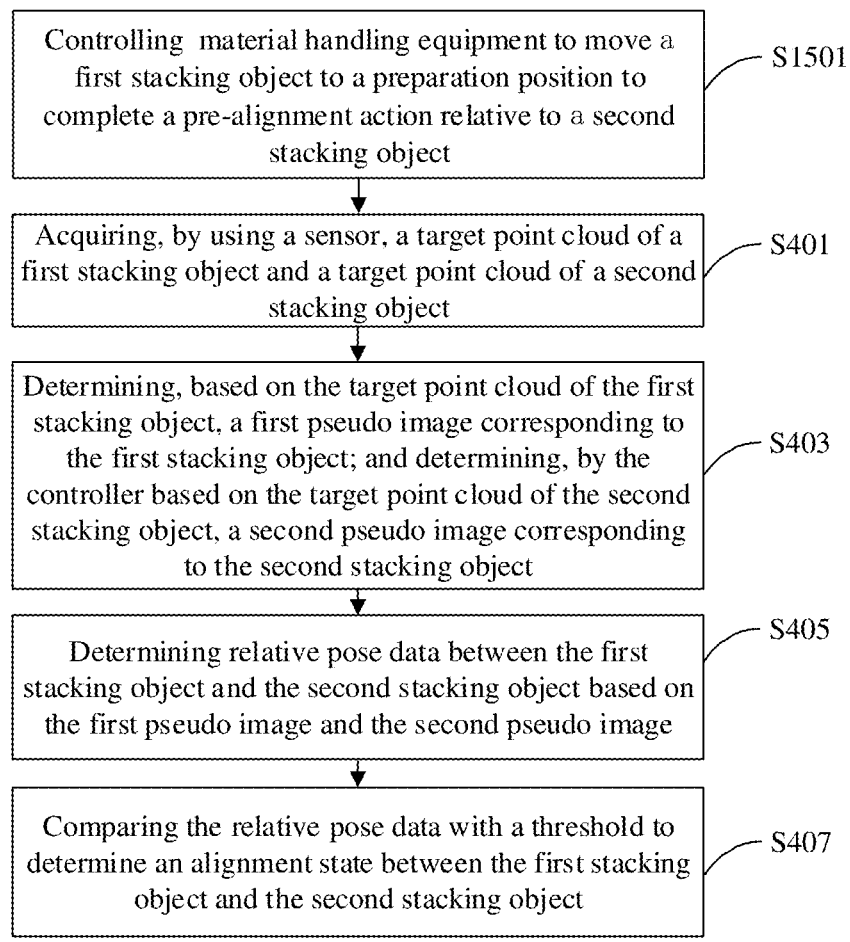
FIG. 15 is a flowchart of a method for determining an alignment state according to an embodiment of the present disclosure.

For example, as shown in FIG. 15, the method mentioned in the above embodiments further includes Step S1501: controlling material handling equipment to move a first stacking object to a preparation position to complete a pre-alignment action relative to a second stacking object.

In some embodiments, before the alignment state is determined, the automated guided forklift moves the first stacking object to a preparation position to complete a pre-alignment action relative to the second stacking object.

Pre-alignment refers to aligning the first stacking object with the second stacking object basically along the Y-axis direction by adjusting the pose of the material handling equipment. That is, a coordinate difference $\Delta Y$ along the Y-axis and a rotational angle difference $\Delta \Psi$ along the Z-axis between the first stacking object and the second stacking object are within respective preset thresholds. The thresholds may be flexibly adjusted depending on different material handling equipments and stacking objects, for example, may be: $-5$ cm$<\Delta Y<5$ cm, $-2°<\Delta\Psi<2°$.

In a pre-alignment phase, before the automated guided forklift carries the first stacking object to move to the second stacking object, the automated guided forklift first raises the fork to an optimal detection height, then calculates, by detecting features such as an upright of the second stacking object, an orientation of the second stacking object, and adjusts the chassis or the fork to complete pre-alignment. In this phase, to ensure that the automated guided forklift is basically aligned with the second stacking object in a traveling direction and a rotating direction, a forward and backward path planning policy is used to implement large error correction, so as to ensure that the first stacking object is basically aligned with the second stacking object.

The foregoing method provided in the embodiments of the present disclosure may be applied to a plurality of application scenarios, including but not limited to an unmanned warehouse scenario and an unmanned lift truck scenario.

An unmanned warehouse may include an automated guided forklift, a storage rack, a picking station, a warehouse management system (Warehouse Management System, WMS), and the like.

The unmanned lift truck scenario includes an automated guided forklift, and a truck.

The foregoing describes specific embodiments of this specification. Other embodiments fall within the scope of the appended claims. In some cases, actions or steps recorded in the claims may be performed in an order other than those described in the embodiments, while still bringing desired results. In addition, the desired results do not require a process illustrated in the drawings to necessarily follow the shown specific order or sequential order. In some implementations, multitasking and parallel processing are also possible or may be advantageous.

According to another embodiment, a controller is provided, to implement any method for determining an alignment state disclosed in embodiments of the present disclosure.

Embodiments in this specification are all described in a progressive manner, for same or similar parts in embodiments, mutual reference may be made. Each embodiment focuses on what is different from other embodiments. Especially, a system embodiment or an apparatus embodiment is basically similar to a method embodiment, and therefore is described briefly; and for related parts, reference may be made to partial descriptions in the method embodiment. The system embodiment and the apparatus embodiment described above are merely an example. The units described as separate parts may be or may not be physically separate, and parts displayed as units may be or may not be physical units, that is, may be located at one position, or may be distributed on a plurality of network units. Some or all of the modules may be selected according to an actual need to achieve the objectives of the solutions of the embodiments. A person of ordinary skill in the art may understand and implement embodiments of the present disclosure without creative efforts.

In addition, an embodiment of the present disclosure further provides a computer-readable storage medium, where the computer-readable storage medium stores a computer program. When the program is executed by a controller, the method in any one of the foregoing method embodiments is implemented.

Material handling equipment is further provided. The material handling equipment includes:
  a material handling equipment body;
  a sensor, where the sensor is mounted on the material handling equipment body; and
  one or more controllers;
  A program instruction, when read and executed by the one or more controllers, cause all or some of the steps in any of the methods for determining an alignment state described in the foregoing embodiments to be performed.

In some examples, the material handling equipment body includes an automated guided forklift body.

The present disclosure further provides a computer program product, including a computer program. When the computer program is executed by a controller, the steps of the method in any one of the foregoing method embodiments are implemented.

Based on the foregoing descriptions of the implementations, a person skilled in the art may clearly understand that the present disclosure may be implemented by software in addition to a necessary universal hardware platform. Based on such an understanding, the technical solutions in the present disclosure essentially, or the part contributing to the conventional technology may be implemented in a form of a computer program product. The computer program product may be stored in a storage medium, for example, a ROM/RAM, a magnetic disk, or an optical disc.

The technical solutions provided in the present disclosure are described above in detail. The principles and implementations of the present disclosure are described herein by using specific examples. The descriptions about embodiments of the present disclosure are merely provided to help understand the methods and core ideas of the present disclosure. In addition, a person of ordinary skill in the art can make variations to the present disclosure in terms of the specific implementations and application scopes according to the ideas of the present disclosure. Therefore, the content of this specification shall not be construed as a limitation on the present disclosure.

What is claimed is:

1. Material handling equipment, comprising a controller, wherein the controller is configured to execute a program instruction to implement the following steps:
  acquiring, by using a sensor, a target point cloud of a first stacking object and a target point cloud of a second stacking object;
  projecting the target point cloud of the first stacking object onto a horizontal plane to generate a first pseudo image;
  projecting the target point cloud of the second stacking object onto a horizontal plane to generate a second pseudo image;
  determining relative pose data between the first stacking object and the second stacking object based on the first pseudo image and the second pseudo image; and
  comparing the relative pose data with a threshold to determine an alignment state between the first stacking object and the second stacking object;
  wherein the projecting the target point cloud of the first stacking object onto the horizontal plane to generate the first pseudo image comprises:
  projecting the target point cloud of the first stacking object onto the horizontal plane by using at least two projection resolutions, to obtain images, with the at least two projection resolutions, corresponding to the target point cloud of the first stacking object; and scaling the images, with the at least two projection resolutions, corresponding to the target point cloud of the first stacking object to a uniform size, and superimposing the images to obtain the first pseudo image; and
  the projecting the target point cloud of the second stacking object onto the horizontal plane to generate the second pseudo image comprises:
  projecting the target point cloud of the second stacking object onto the horizontal plane by using at least two projection resolutions, to obtain images, with the at least two projection resolutions, corresponding to the target point cloud of the second stacking object; and scaling the images, with the at least two projection resolutions, corresponding to the target point cloud of the second stacking object to a uniform size, and superimposing the images to obtain the second pseudo image.

2. The material handling equipment according to claim 1, wherein the first pseudo image is a first grayscale image, and the second pseudo image is a second grayscale image.

3. The material handling equipment according to claim 1, wherein the controller is configured to further execute the following step:
before determining the alignment state, controlling material handling equipment to move the first stacking object to a preparation position to complete a pre-alignment action relative to the second stacking object.

4. The material handling equipment according to claim 1, wherein the determining the relative pose data between the first stacking object and the second stacking object based on the first pseudo image and the second pseudo image comprises:
determining a boundary line of the first pseudo image;
determining a target point in the first pseudo image based on the boundary line of the first pseudo image;
determining a boundary line of the second pseudo image;
determining a target point in the second pseudo image based on the boundary line of the second pseudo image; and
determining the relative pose data between the first stacking object and the second stacking object based on the boundary line of the first pseudo image and the target point in the first pseudo image and the boundary line of the second pseudo image and the target point in the second pseudo image.

5. The material handling equipment according to claim 1, wherein the determining the relative pose data between the first stacking object and the second stacking object based on the first pseudo image and the second pseudo image comprises:
determining a boundary line of the first pseudo image;
determining, from the target point cloud of the first stacking object, a boundary point cloud, corresponding to the boundary line of the first pseudo image, of the first stacking object;
determining a first target point of the first stacking object based on the boundary point cloud of the first stacking object;
determining a boundary line of the second pseudo image;
determining, from the target point cloud of the second stacking object, a boundary point cloud, corresponding to the boundary line of the second pseudo image, of the second stacking object;
determining a second target point of the second stacking object based on the boundary point cloud of the second stacking object;
determining a relative angle difference between the first stacking object and the second stacking object based on the boundary point cloud of the first stacking object and the boundary point cloud of the second stacking object; and
determining the relative pose data between the first stacking object and the second stacking object based on a relative position difference between the first target point and the second target point and the relative angle difference.

6. The material handling equipment according to claim 5, wherein the boundary point cloud of the first stacking object comprises a first boundary point cloud, a third boundary point cloud, and a fifth boundary point cloud; and
the boundary point cloud of the second stacking object comprises a second boundary point cloud, a fourth boundary point cloud, and a sixth boundary point cloud.

7. The material handling equipment according to claim 6, wherein the determining the first target point of the first stacking object based on the boundary point cloud of the first stacking object comprises:
determining a first edge line of the first stacking object based on the first boundary point cloud;
determining a third edge line of the first stacking object based on the third boundary point cloud;
determining a fifth edge line of the first stacking object based on the fifth boundary point cloud;
determining a first centerline based on the third edge line and the fifth edge line; and
determining the first target point based on the first centerline and the first edge line; and
the determining the second target point of the second stacking object based on the boundary point cloud of the second stacking object comprises:
determining a second edge line of the second stacking object based on the second boundary point cloud;
determining a fourth edge line of the second stacking object based on the fourth boundary point cloud;
determining a sixth edge line of the second stacking object based on the sixth boundary point cloud;
determining a second centerline based on the fourth edge line and the sixth edge line; and
determining the second target point based on the second centerline and the second edge line.

8. The material handling equipment according to claim 7, wherein the first target point is an intersection between the first centerline and the first edge line; and the second target point is an intersection between the second centerline and the second edge line.

9. The material handling equipment according to claim 7, wherein the determining the relative angle difference between the first stacking object and the second stacking object based on the boundary point cloud of the first stacking object and the boundary point cloud of the second stacking object comprises:
calculating a first angle between the first edge line and the second edge line, and determining the relative angle difference between the first stacking object and the second stacking object based on the first angle.

10. The material handling equipment according to claim 7, wherein the determining the relative angle difference between the first stacking object and the second stacking object based on the boundary point cloud of the first stacking object and the boundary point cloud of the second stacking object comprises:
calculating a second angle between the first centerline and the second centerline, and determining the relative angle difference between the first stacking object and the second stacking object based on the second angle.

11. The material handling equipment according to claim 7, wherein the determining the relative angle difference between the first stacking object and the second stacking object based on the boundary point cloud of the first stacking object and the boundary point cloud of the second stacking object comprises:
calculating a second angle between the first centerline and the second centerline;
calculating a first angle between the first edge line and the second edge line; and
obtaining the relative angle difference between the first stacking object and the second stacking object by weighting the first angle and the second angle.

12. The material handling equipment according to claim 7, wherein the determining the relative angle difference between the first stacking object and the second stacking object based on the boundary point cloud of the first stacking object and the boundary point cloud of the second stacking object comprises:
- determining a first angle value of the first stacking object;
- determining a second angle value of the second stacking object; and
- determining the relative angle difference between the first stacking object and the second stacking object based on a difference between the first angle value and the second angle value.

13. The material handling equipment according to claim 1, wherein the comparing the relative pose data with the threshold to determine the alignment state between the first stacking object and the second stacking object comprises:
- in a case where the relative pose data is greater than or equal to the threshold, determining the alignment state as misaligned; and
- in a case where the relative pose data is less than the threshold, determining the alignment state as aligned.

14. The material handling equipment according to claim 13, wherein the controller is configured to further execute the following steps:
- when the alignment state is misaligned, controlling material handling equipment to adjust a pose;
- re-acquiring, by using the sensor, a target point cloud of the first stacking object and a target point cloud of the second stacking object;
- re-determining the relative pose data; and
- re-determining the alignment state based on the relative pose data until the relative pose data is less than the threshold.

15. The material handling equipment according to claim 13, wherein the controller is configured to further execute the following step:
- when the alignment state is aligned, controlling material handling equipment to place the first stacking object onto the second stacking object, to complete stacking.

16. A controller configured to execute a program instruction, to implement the following steps:
- acquiring, by using a sensor, a target point cloud of a first stacking object and a target point cloud of a second stacking object;
- projecting the target point cloud of the first stacking object onto a horizontal plane to generate a first pseudo image;
- projecting the target point cloud of the second stacking object onto a horizontal plane to generate a second pseudo image;
- determining relative pose data between the first stacking object and the second stacking object based on the first pseudo image and the second pseudo image; and
- comparing the relative pose data with a threshold to determine an alignment state between the first stacking object and the second stacking object;
- wherein the projecting the target point cloud of the first stacking object onto the horizontal plane to generate the first pseudo image comprises:
- projecting the target point cloud of the first stacking object onto the horizontal plane by using at least two projection resolutions, to obtain images, with the at least two projection resolutions, corresponding to the target point cloud of the first stacking object; and scaling the images, with the at least two projection resolutions, corresponding to the target point cloud of the first stacking object to a uniform size, and superimposing the images to obtain the first pseudo image; and
- the projecting the target point cloud of the second stacking object onto the horizontal plane to generate the second pseudo image comprises:
- projecting the target point cloud of the second stacking object onto the horizontal plane by using at least two projection resolutions, to obtain images, with the at least two projection resolutions, corresponding to the target point cloud of the second stacking object; and scaling the images, with the at least two projection resolutions, corresponding to the target point cloud of the second stacking object to a uniform size, and superimposing the images to obtain the second pseudo image.

17. A method for determining an alignment state, comprising:
- acquiring, by using a sensor, a target point cloud of a first stacking object and a target point cloud of a second stacking object;
- projecting the target point cloud of the first stacking object onto a horizontal plane to generate a first pseudo image;
- projecting the target point cloud of the second stacking object onto a horizontal plane to a generate The second pseudo image;
- determining relative pose data between the first stacking object and the second stacking object based on the first pseudo image and the second pseudo image; and
- comparing the relative pose data with a threshold to determine an alignment state between the first stacking object and the second stacking object;
- wherein the projecting the target point cloud of the first stacking object onto the horizontal plane to generate the first pseudo image comprises:
- projecting the target point cloud of the first stacking object onto the horizontal plane by using at least two projection resolutions, to obtain images, with the at least two projection resolutions, corresponding to the target point cloud of the first stacking object; and scaling the images, with the at least two projection resolutions, corresponding to the target point cloud of the first stacking object to a uniform size, and superimposing the images to obtain the first pseudo image; and
- the projecting the target point cloud of the second stacking object onto the horizontal plane to generate the second pseudo image comprises:
- projecting the target point cloud of the second stacking object onto the horizontal plane by using at least two projection resolutions, to obtain images, with the at least two projection resolutions, corresponding to the target point cloud of the second stacking object; and scaling the images, with the at least two projection resolutions, corresponding to the target point cloud of the second stacking object to a uniform size, and superimposing the images to obtain the second pseudo image.

* * * * *